US007177346B1

(12) United States Patent
Doi

(10) Patent No.: US 7,177,346 B1
(45) Date of Patent: Feb. 13, 2007

(54) RADIO RECEPTION SYSTEM THAT CAN REMOVE INTERFERENCE SIGNAL COMPONENT SIGNAL COMPONENT OF ANOTHER USER FROM A RECEPTION SIGNAL

(75) Inventor: Yoshiharu Doi, Gifu (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/204,279

(22) Filed: Dec. 3, 1998

(30) Foreign Application Priority Data

Dec. 4, 1997 (JP) ............................ 9-333980
Mar. 17, 1998 (JP) ............................ 10-066802
Nov. 16, 1998 (JP) ............................ 10-325291

(51) Int. Cl.
*H04B 1/69* (2006.01)
(52) U.S. Cl. ........................................ 375/148
(58) Field of Classification Search ................ 375/130, 375/134–137, 142, 144, 146–148, 224, 295, 375/296, 346, 347, 349, 299; 370/310, 464
See application file for complete search history.

(56) References Cited

U.S. PATENT DOCUMENTS

| | | | | |
|---|---|---|---|---|
| 5,387,900 A | * | 2/1995 | Plonsky et al. | 340/572.4 |
| 5,579,304 A | * | 11/1996 | Sugimoto et al. | 370/342 |
| 5,602,832 A | * | 2/1997 | Hudson | 370/342 |
| 5,646,964 A | * | 7/1997 | Ushirokawa et al. | 370/342 |
| 5,659,584 A | * | 8/1997 | Uesugi et al. | 375/347 |
| 5,915,205 A | * | 6/1999 | Chen | 725/125 |
| 6,128,276 A | * | 10/2000 | Agee | 370/208 |
| 6,131,013 A | * | 10/2000 | Bergstrom et al. | 455/63.1 |
| 6,449,268 B1 | * | 9/2002 | Doi | 370/349 |
| 6,694,154 B1 | * | 2/2004 | Molnar et al. | 455/562.1 |

FOREIGN PATENT DOCUMENTS

| | | |
|---|---|---|
| JP | 10-190495 | 7/1998 |
| JP | 11-205286 | 7/1999 |
| JP | 11-251959 | 9/1999 |
| JP | 2000-138605 | 5/2000 |

OTHER PUBLICATIONS

Abstract of Nov., 1995 Technical Report of IEICE.
Partial translation of paper by Kazuhiko Fukawa regarding Structure and Operation of Proposed System.

(Continued)

*Primary Examiner*—Pankaj Kumar
(74) *Attorney, Agent, or Firm*—Armstrong, Kratz, Quintos, Hanson & Brooks, LLP

(57) ABSTRACT

In a receptive system of a base station according to the communication system of a PDMA, CDMA and the like, the reception signals from a plurality of users received on a plurality of antennas are frequency-converted by a frequency conversion circuit, and then converted into digital signals by an A/D converter to be applied to a DSP. The signal of a particular user is extracted from the input signal by an adaptive array. Also, the interference user signal component is removed by an interference canceller. Accordingly, the signal component of a desired user having the interference component caused by an unrequired user signal suppressed is output. Thus, the communication quality in a radio communication system such as a mobile communication system can be improved.

28 Claims, 27 Drawing Sheets

OTHER PUBLICATIONS

Partial translation of paper by Naoto Ishii, et al. regarding CDMA Time-Space Interference Cancellation System.

Partial translation of paper by Shousei Yoshida, et al. regarding Serial/Parallel Hybrid Structure Canceller.

Abstract of Jul., 1995 Technical Report of IEICE.

Partial translation of paper by Masafumi Tsutsui, et al. regarding Structure of Interference Canceller Employing Array Antenna.

* cited by examiner

FIG.27A PRIOR ART FDMA

FIG.27B PRIOR ART TDMA

FIG.27C PRIOR ART PDMA

RADIO RECEPTION SYSTEM THAT CAN REMOVE INTERFERENCE SIGNAL COMPONENT SIGNAL COMPONENT OF ANOTHER USER FROM A RECEPTION SIGNAL

BACKGROUND OF THE INVENTION

1. Field of the Invention

The present invention relates to radio reception systems. More particularly, the present invention relates to a radio reception system by a communication system such as the PDMA (Path Division Multiple Access) and the CDMA (Code Division Multiple Access) that can remove the interference signal component of another user from a reception signal.

2. Description of the Related Art

In the field of mobile communication systems such as portable telephones that have become extremely popular recently, various transmission channel allocation methods have been proposed to effectively use the frequencies. Some thereof are actually in practice.

FIGS. 27A–27C show the channel arrangement in various communication systems of FDMA (Frequency Division Multiple Access), TDMA (Time Division Multiple Access), and PDMA. The systems of FDMA, TDMA, and PDMA will be described briefly with reference to FIGS. 27A–27C.

Referring to FIG. 27A corresponding to the FDMA channel arrangement, the analog signals of users 1–4 are frequency-divided to be transmitted in radio waves of different frequencies f1–f4. The signals of respective users 1–4 are separated by frequency filters.

Referring to FIG. 27B corresponding to the TDMA channel arrangement, the digitized signals of respective users are time-divided and transmitted in radio waves of different frequencies f1–f4 at every constant period of time (time slot). The signals of respective users are separated by frequency filters and by time synchronization between a base station and each user's mobile terminal device.

Recently, the PDMA system has been proposed to improve the radio wave frequency usability to comply with the spread of portable telephones. In the PDMA system shown in FIG. 27C, one time slot of the same frequency is divided spatially to transmit data of a plurality of users. The signals of respective users in the PDMA system are separated by means of frequency filters, time synchronization between a base station and each user's mobile terminal device, and a signal extraction device such as an adaptive array.

FIG. 28 shows a conventional reception system of a base station for use in PDMA. Four antennas 3–6 are provided to distinguish between user 1 and user 2. The outputs of respective antennas are applied to a frequency conversion circuit 7 to be frequency-converted by a corresponding local oscillation signal Lo respectively and then converted into digital signals by an A/D converter 8. The signals are provided to a DSP (Digital Signal Processor) 10.

DSP 10 includes adaptive arrays 11 and 12, a reception signal vector calculator 13, a memory 14, a correlation value calculator 15, and a channel allocation apparatus 16. Each of adaptive arrays 11 and 12 extracts only a particular user signal from the reception signals output from A/D converter 8. Each adaptive array extracts the user signal specified by channel allocation apparatus 16 that will be described afterwards, depending on the weight vector calculation method such as the method using the preamble included in the time slot or the method taking advantage of the feature of the envelope line of a modulation signal being constant.

Reception signal vector calculator 13 receives the reception signals from A/D converter 8 and the output signals of adaptive arrays 11 and 12 to calculate reception signal vectors corresponding to all the users. The calculated reception signal vectors are stored in memory 14. Channel allocation apparatus 16 specifies two users with respect to memory 14 and correlation value calculator 15. Correlation value calculator 15 calculates the cross correlation value of the reception signal vectors of the two specified users out of the reception signal vectors stored in memory 14. Channel allocation apparatus 16 receives the calculated cross correlation value of the reception signal vectors of the two users. When the cross correlation value is equal to or smaller than a constant value, those two users are connected in path multiplex at the same time slot.

Adaptive arrays 11 and 12 shown in FIG. 28 extract the signals of corresponding users 1 and 2, respectively. When a user 3, for example, in addition to users 1 and 2, transmits a signal from a direction identical to that of user 1, a signal which is a mixture of the signals of users 1 and 3 will be output from adaptive array 11. However, the conventional adaptive array 11 cannot separate the signals of users 1 and 3. Therefore, it was not possible to extract only the signal of user 1.

SUMMARY OF THE INVENTION

In view of the foregoing, an object of the present invention is to provide a radio reception system that can improve communication quality by canceling the interference component of an unrequired user signal using an interference canceller.

Another object of the present invention is to provide a radio reception system aimed to further remove the interference component by providing a plurality of stages of user detection devices having the interference removal ability.

A further object of the present invention is to provide a radio reception system aimed to improve communication quality in a communication system of the CDMA communication method having a large transmission capacity.

According to an aspect of the present invention, a radio reception system that can receive signals from a plurality of users using a plurality of antennas comprises a signal processing circuit applying a predetermined signal process on the signals received on the plurality of antennas, an adaptive array extracting a signal component corresponding to a particular user out of the plurality of users according to the signals output from the signal processing circuit, and an interference canceller removing an interference signal component caused by a signal component from another user included in the signal component extracted by the adaptive array.

According to another aspect of the present invention, a radio reception system that can receive signals from a plurality of users using a plurality of antennas includes a signal processing circuit applying a predetermined signal process on the signals received on the plurality of antennas, and a user detection device. The user detection device includes an adaptive array extracting a signal component corresponding to a particular user out of the plurality of users according to the signals output from the signal processing circuit, a parameter estimator estimating parameter information associated with a relationship of the signal component extracted by the adaptive array with respect to the signal output from the signal processing circuit, and an arithmetic unit providing a signal having the signal component corresponding to a particular user removed from the signal output from the signal processing circuit taking account of the parameter information.

According to a further aspect of the present invention, a radio reception system that can receive signals from a plurality of users using a plurality of antennas includes a signal processing circuit applying a predetermined signal process on the signals received on the plurality of antennas, and a plurality of stages of user detection devices. Each stage of the user detection device includes an adaptive array extracting a signal component corresponding to a particular user common to every stage out of the plurality of users according to an input signal, a parameter estimator estimating parameter information associated with relationship of the signal component extracted by the adaptive array with respect to the signal output from the signal processing circuit, and an arithmetic unit providing a signal having the signal component corresponding to the particular user removed from the signal output from the signal processing circuit taking into account the parameter information. The plurality of stages of user detection devices are connected so that the signal output from the signal processing circuit is applied to the input of the adaptive array of the first stage of the user detection device, and the output of the arithmetic unit of the former stage of two adjacent user detection devices is applied to the input of the adaptive array of the latter stage.

According to still another aspect of the present invention, a radio reception system that can receive signals from a plurality of users using a plurality of antennas comprises a signal processing circuit applying a predetermined signal process on the signals received on the plurality of antennas, and a plurality of stages of user detection devices. Each stage of the user detection device includes an adaptive array extracting a signal component corresponding to a particular user out of the plurality of users according to an input signal, a parameter estimator for estimating parameter information associated with relationship of the signal component extracted by the adaptive array with respect to the signal input to the adaptive array, and an arithmetic unit providing a signal having the signal component corresponding to the particular user removed from the signal input to the adaptive array taking into account the parameter information. The plurality of stages of user detection devices are connected so that the signal output from the signal processing circuit is applied to the input of the adaptive array of the first stage of the user detection device, and the output of the arithmetic unit of the former stage of two adjacent user detection devices is applied to the input of the adaptive array of the latter stage.

According to a still further aspect of the present invention, a radio reception system that can receive signals from a plurality of users using a plurality of antennas comprises a signal processing circuit applying a predetermined signal process on the signals received on the plurality of antennas, and a plurality of stages of user detection devices. Each stage of the user detection device includes an adaptive array extracting and providing a signal component corresponding to a particular user differing for each stage out of the plurality of users according to an input signal, a parameter estimator estimating parameter information associated with relationship of the signal component extracted by the adaptive array with respect to the signal input to the adaptive array, and an arithmetic unit removing the signal component corresponding to the particular user from the signal input to the adaptive array taking into account the parameter information. The plurality of stages of user detection devices are connected so that the signal output from the signal processing circuit is applied to the input of the adaptive array of the first stage of the user detection device, and the output of the arithmetic unit of the former stage of two adjacent user detection devices is applied to the input of the adaptive array of the latter stage.

According to yet a further aspect of the present invention, the signals from the plurality of users are signals transmitted by the PDMA communication system.

According to yet another aspect of the present invention, the signals from the plurality of users are signals transmitted by the CDMA communication system.

According to yet a still further aspect of the present invention, the signal transmitted by the CDMA communication system is diffused in advance by a predetermined diffusion code at the transmitter side. The radio reception system further includes an inverse diffuser that inversely diffuses the signal output from the signal processing circuit by a corresponding diffusion code by the CDMA communication system and applying the inverse-diffused signal to the adaptive array.

Thus, the main advantage of the present invention is that, when a signal of a particular user is to be extracted from signals received from a plurality of users using a plurality of antennas, the interference component by an unrequired user signal component can be removed to improve communication quality.

Another advantage of the present invention is that, by providing a plurality of stages of user detection devices each having the ability to remove the interference component caused by an unrequired user signal component, the interference component can be removed in a plurality of stages to further improve communication quality.

A further advantage of the present invention is that the communication quality is improved together with the transmission capacity by removing the interference component caused by an unrequired user signal component from a desired user signal in a communication system of a large transmission capacity such as the CDMA communication system.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 27A, 27B and 27C are channel arrangement diagrams of a user signal according to communication systems of the FDMA, TDMA, and PDMA, respectively.

DESCRIPTION OF THE PREFERRED EMBODIMENTS

Figure 1:
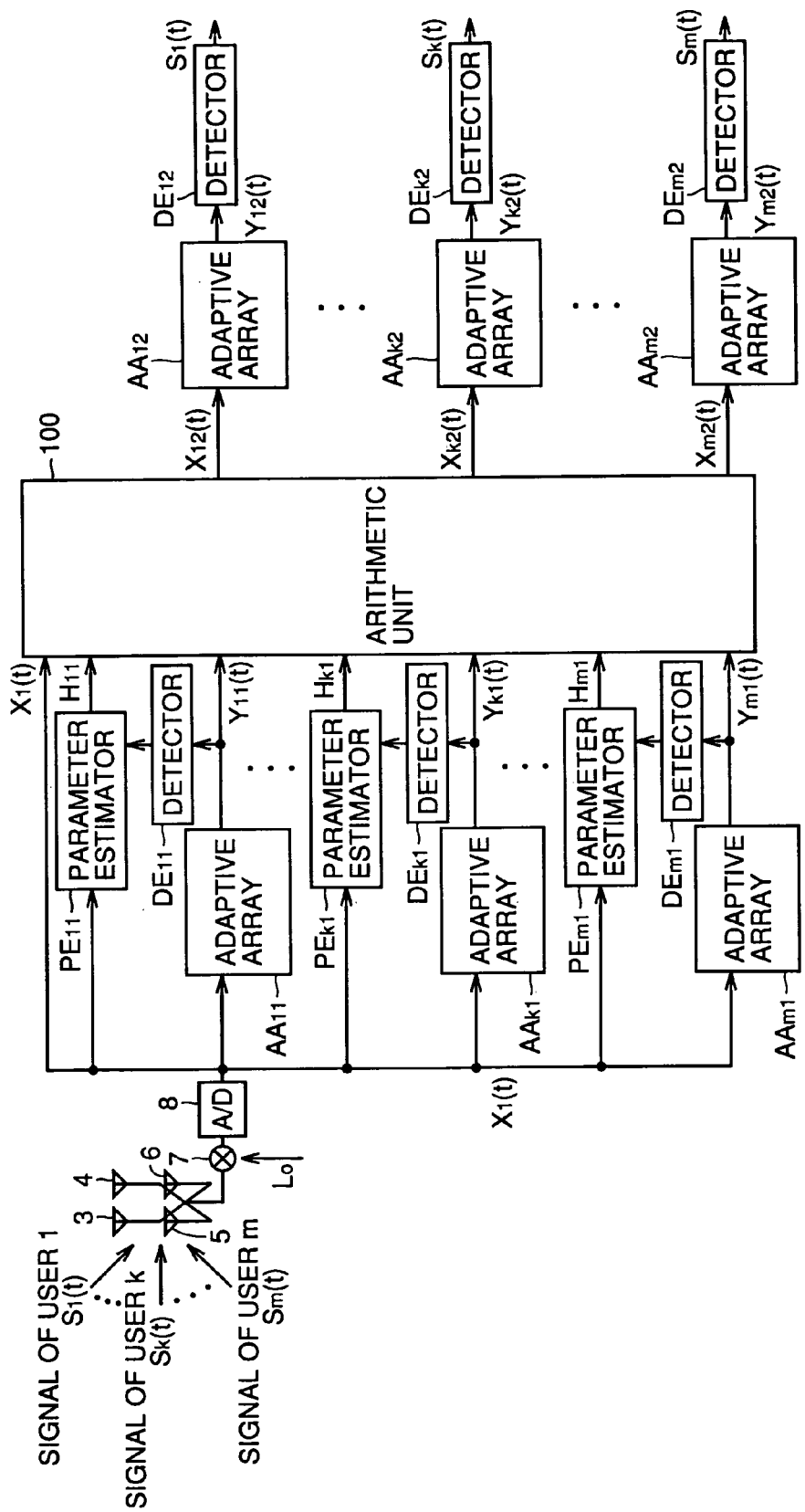
FIG. 1 is a block diagram of a reception signal of a base station for the PDMA according to a first embodiment of the present invention.

FIG. 1 is a block diagram showing a reception system of a base station for the PDMA according to a first embodiment of the present invention. The reception system of the first embodiment separates signals $S_1(t), \ldots, S_k(t), \ldots, S_m(t)$ from m (m is an integer of at least 2) users 1, ..., k, ..., m transmitted at the same time to extract the signals in parallel.

Figure 28:
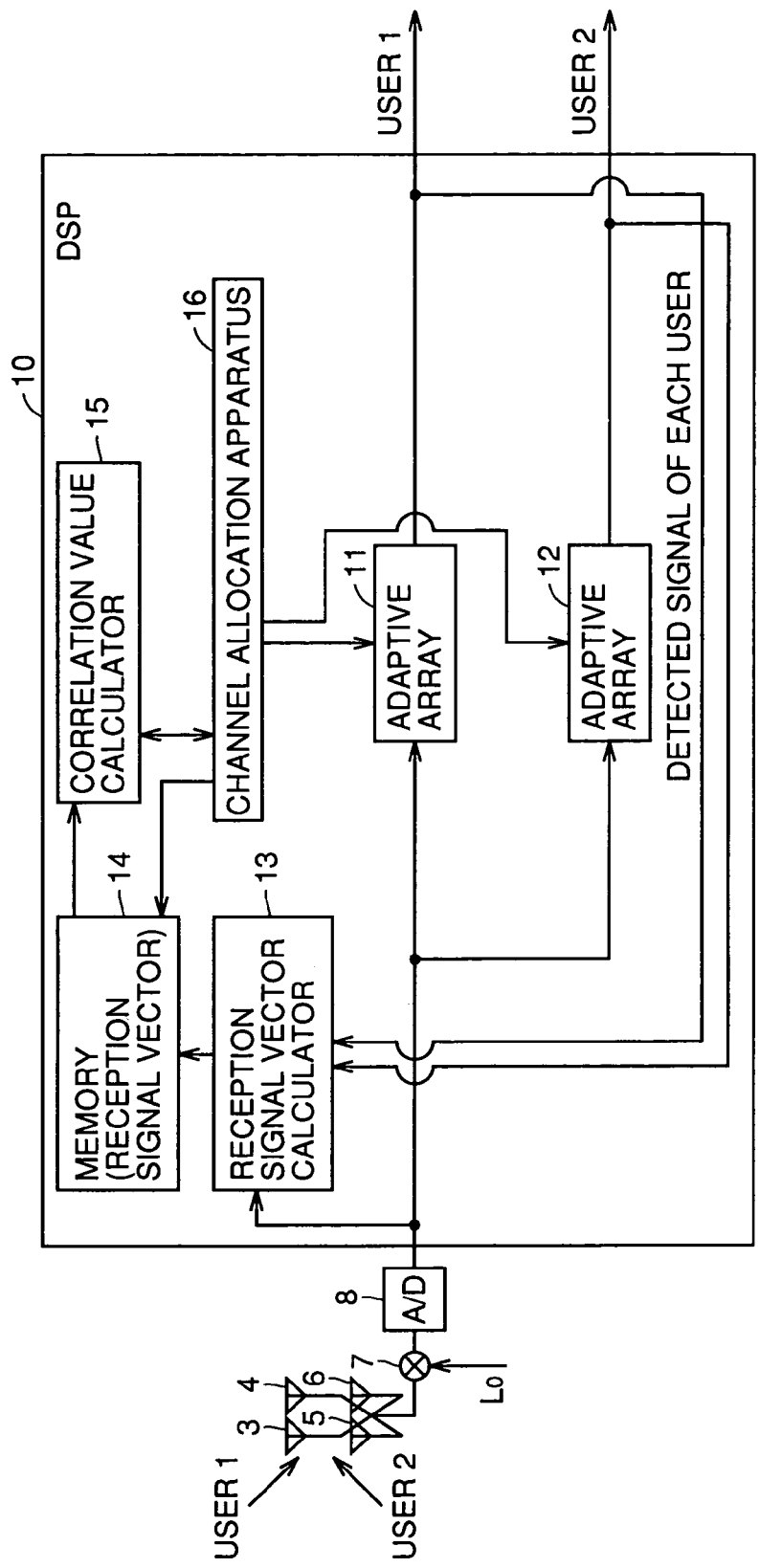
FIG. 28 is a block diagram showing a conventional reception system of a base station for the PDMA.

Referring to FIG. 1, the reception system of the PDMA base station includes four antennas 3–6, a frequency converter circuit 7, and an A/D converter 8, similar to the conventional system of FIG. 28. The input signal vector $X_1(t)$ output from A/D converter 8 is applied to an arithmetic unit 100, the first stage of adaptive arrays $AA_{11}, \ldots, AA_{k1}, \ldots, AA_{m1}$, and parameter estimators $PE_{11}, \ldots, PE_{k1}, \ldots, PE_{m1}$. The details of the adaptive array will be described afterwards.

User signals $Y_{11}(t), \ldots, Y_{k1}(t), \ldots, Y_{m1}(t)$, each of which includes most intensively the signal component of a corresponding user (also including the interference signal component from other users) are extracted from adaptive arrays $AA_{11}, \ldots, AA_{k1}, \ldots, AA_{m1}$ to be applied to arithmetic array 100 and also to detectors $DE_{11}, \ldots, DE_{k1}, \ldots, DE_{m1}$, respectively, to be detected.

Parameter estimators $PE_{11}, \ldots, PE_{k1}, \ldots, PE_{m1}$ estimate reception signal coefficient vectors $H_{11}, \ldots, H_{k1}, \ldots, H_{m1}$ of a corresponding users respectively according to the input signal vector $X_1(t)$ and the corresponding detected outputs of detectors $DE_{11}, \ldots, DE_{k1}, \ldots, DE_{m1}$. The estimated vectors are applied to arithmetic unit 100. More specifically, each parameter estimator estimates how much the corresponding user signal component is included in the input signal vector and how much the phase of the corresponding user signal component is rotated with respect to the input signal vector.

Arithmetic unit 100 subtracts all the other user's signal components excluding current user i from input signal vector $X_1(t)$ for each user i (i=1, 2, ..., m) to remove the interference signal component. The further input signal vector $X_{i2}(t)$ of the relevant user i is calculated and output. The operation of arithmetic unit 100 will be described in detail afterwards with reference to FIG. 2.

Arithmetic unit 100 provides input signal vectors $X_{12}(t), \ldots, X_{k2}(t), \ldots, X_{m2}(t)$ corresponding to respective users to the corresponding second stage of adaptive arrays $AA_{12}, \ldots, AA_{k2}, \ldots, AA_{m2}$.

User signals $Y_{12}(t), \ldots, Y_{k2}(t), \ldots, Y_{m2}(t)$ output from adaptive arrays $AA_{12}, \ldots, AA_{k2}, \ldots, AA_{m2}$ are detected by corresponding detectors $DE_{12}, \ldots, DE_{k2}, \ldots, DE_{m2}$, respectively, to be output as further user signals $S_1(t), \ldots, S_k(t), \ldots, S_m(t)$.

Figure 2:
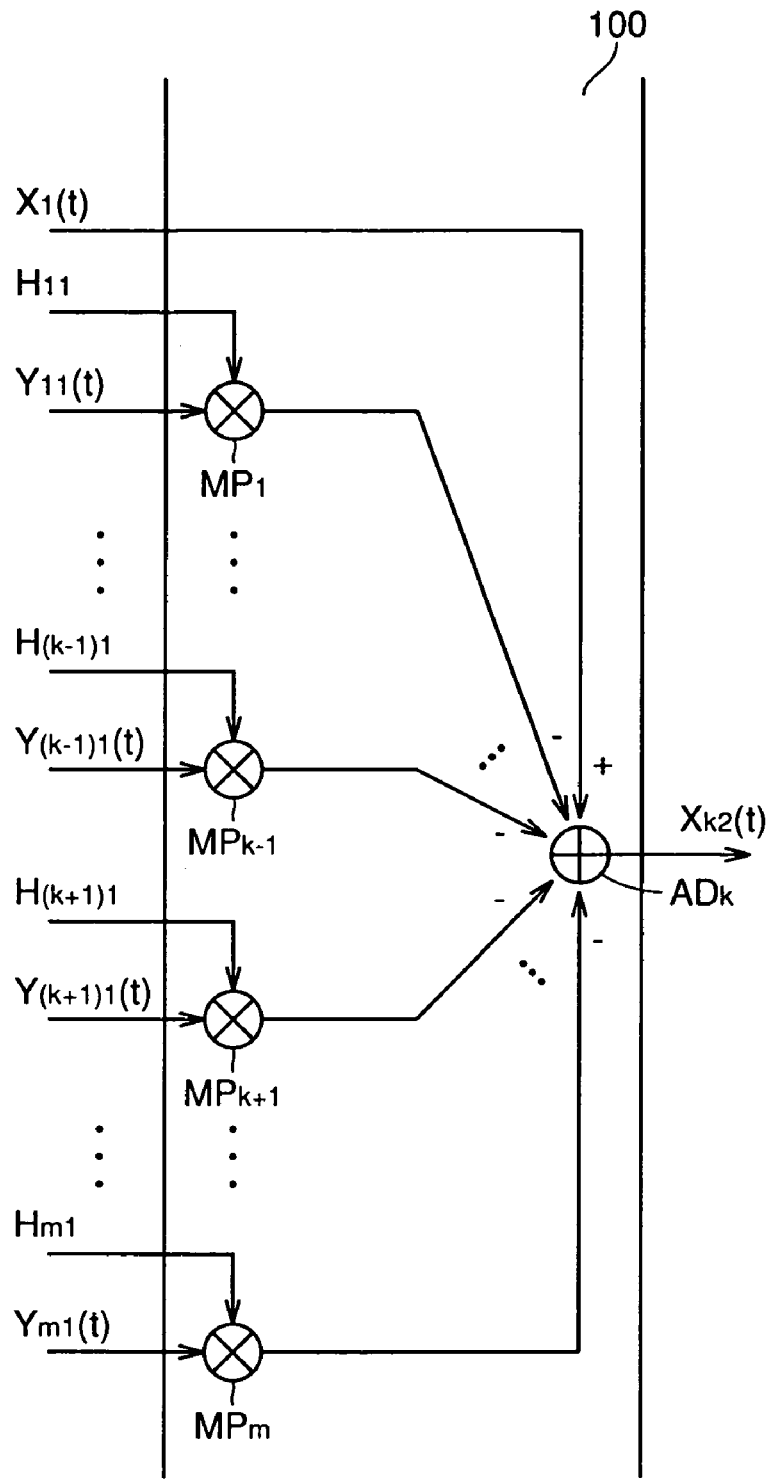
FIG. 2 is a block diagram showing a structure of the arithmetic unit of FIG. 1.

FIG. 2 is a specific block diagram of arithmetic unit 100 of FIG. 1. In FIG. 2, arithmetic unit 100 is formed of multipliers $MP_1, \ldots, MP_{k-1}, MO_{k+1}, \ldots, MP_m$ and an adder $AD_k$. Although not shown for the sake of simplification, it is assumed that a multiplier $MP_k$ and adders $AD_1, \ldots, AD_{k-1}, AD_{k+1}, \ldots, AD_m$ are also incorporated in arithmetic unit 100 in addition to the multipliers and adders shown in the drawings.

Multipliers $MP_1, \ldots, MP_{k-1}, MP_{k+1}, \ldots, MP_m$ are applied with user signals $Y_{11}(t), \ldots, Y_{(k-1)1}(t), Y_{(k+1)1}(t), \ldots, Y_{m1}(t)$ from adaptive arrays $AA_{11}, \ldots, AA_{k-1}, AA_{k+1}, \ldots, AA_m$ and reception signal coefficient vectors $H_{11}, \ldots, H_{(k-1)1}, H_{(k+1)1}, \ldots, H_{m1}$ from parameter estimators $PE_{11}, \ldots, PE_{(k-1)1}, PE_{(k+1)1}, \ldots, PE_{m1}$, respectively.

The outputs of multipliers $MP_1, \ldots, MP_{k-1}, MP_{k+1}, \ldots, MP_m$ are applied to the negative inputs of adder $AD_k$. Input signal vector $X_1(t)$ is applied to the positive input of adder $AD_k$. As a result, the signal component of users other than user k are subtracted from input signal vector $X_1(t)$, and the signal component $X_{k2}(t)$ corresponding to user k is output from adder $AD_k$. It is assumed that these adaptive arrays, parameter estimators, and arithmetic unit form one stage of user detection device as a whole.

As a result, the interference signal component is considerably removed. The new input vector signal $X_{k2}(t)$ having the interference signal component removed considerably by arithmetic unit 100 is applied to the corresponding adaptive array $AA_{k2}$ (FIG. 1) of the second stage. Eventually, the ratio of the interference signal component of other users included in the final output user signal $S_k(t)$ can be reduced sufficiently to allow realization of favorable communication property.

Similarly and concurrently, each of the adders not shown other than adder $AD_k$ receives the outputs from corresponding ones of multipliers $MP_1, \ldots, MP_k, \ldots, MP_m$ excluding the multiplier corresponding to the relevant adder, and input signal vector $X_1(t)$. Each adder provides the new input signal vector shown in FIG. 1, which is applied to the corresponding adaptive array of the second stage.

A more specific operation of the apparatus shown in FIGS. 1 and 2 will be described now. Assuming that there are n antenna elements and m users conversing at the same time, input signal vector $X_1(t)$ output from A/D converter 8 is represented by the following equations.

$$X_1(t) = [x_1(t), x_2(t), \ldots, x_n(t)]^T \quad (1)$$

$$x_j(t) = h_{j1}S_1(t) + h_{j2}S_2(t) + \ldots + h_{ji}S_i(t) + \ldots + h_{jm}S_m(t) + n_j(t), (j=1, 2, \ldots, n) \quad (2)$$

The above equations (1) and (2) can be represented by the following equation (3) in vector representation.

$$X_1(t) = H_1 S_1(t) + H_2 S_2(t) + \ldots + H_i S_i(t) + \ldots + H_m S_m(t) + N(t) \quad (3)$$

$$H_i = [h_{1i}, h_{2i}, \ldots, h_{ni}]^T, (i=1, 2, \ldots, m) \quad (4)$$

$$N(t) = [n_1(t), n_2(t), \ldots, n_n(t)]^T \quad (5)$$

The operation of providing a new input signal vector $X_{k2}(t)$ from arithmetic unit 100 of FIG. 2 will be described in further detail. It is assumed that $H_i$ ($i=1, 2 \ldots, m$) can be estimated by parameter estimators $PE_{11}, \ldots, PE_{k1} \ldots, PE_{m1}$. Assuming that adaptive arrays $AA_{11}, \ldots, AA_{k1}, \ldots, AA_{m1}$ of the first stage operate relatively favorably, then $Y_{i1}(t) \approx S_i(t)$.

At this current stage, all the user signals and the reception signal coefficient vectors for all the user signals are obtained. Here, input signal vector $X_{k2}(t)$ used in the signal detection of user k of the second stage can be obtained by the following equation (6).

$$X_{k2}(t) = X_1(t) - H_1 S_1(t) - \ldots - H_{k-1}S_{k-1}(t) - H_{k+1}S_{k+1}(t) - \ldots - H_m S_m(t) \quad (6)$$

Inserting equation (3) into this equation (6), the following equation (7) is obtained.

$$X_{k2}(t) = H_k S_k(t) + N(t) \quad (7)$$

Comparing $X_1(t)$ with $X_{k2}(t)$, $X_{k2}(t)$ has the interference component $S_i(t)$ ($i=1, 2, \ldots m$; where $i \neq k$) excluding $S_k(t)$ more reduced, so that the operation of the adaptive array of the second stage is facilitated.

In FIG. 1, detectors $DE_{11}, \ldots, DE_{k1}, \ldots, DE_{m1}$ can be arranged in adaptive arrays $AA_{11}, \ldots, AA_{k1}, \ldots, AA_{m1}$, so that user signals $Y_{11}(t), \ldots, Y_{k1}(t), \ldots, Y_{m1}(t)$ are applied to corresponding detectors, respectively. Alternatively, each detector can be incorporated in arithmetic unit 100. Further alternatively, the detector can be omitted, although the characteristic will be degraded slightly.

Figure 3:
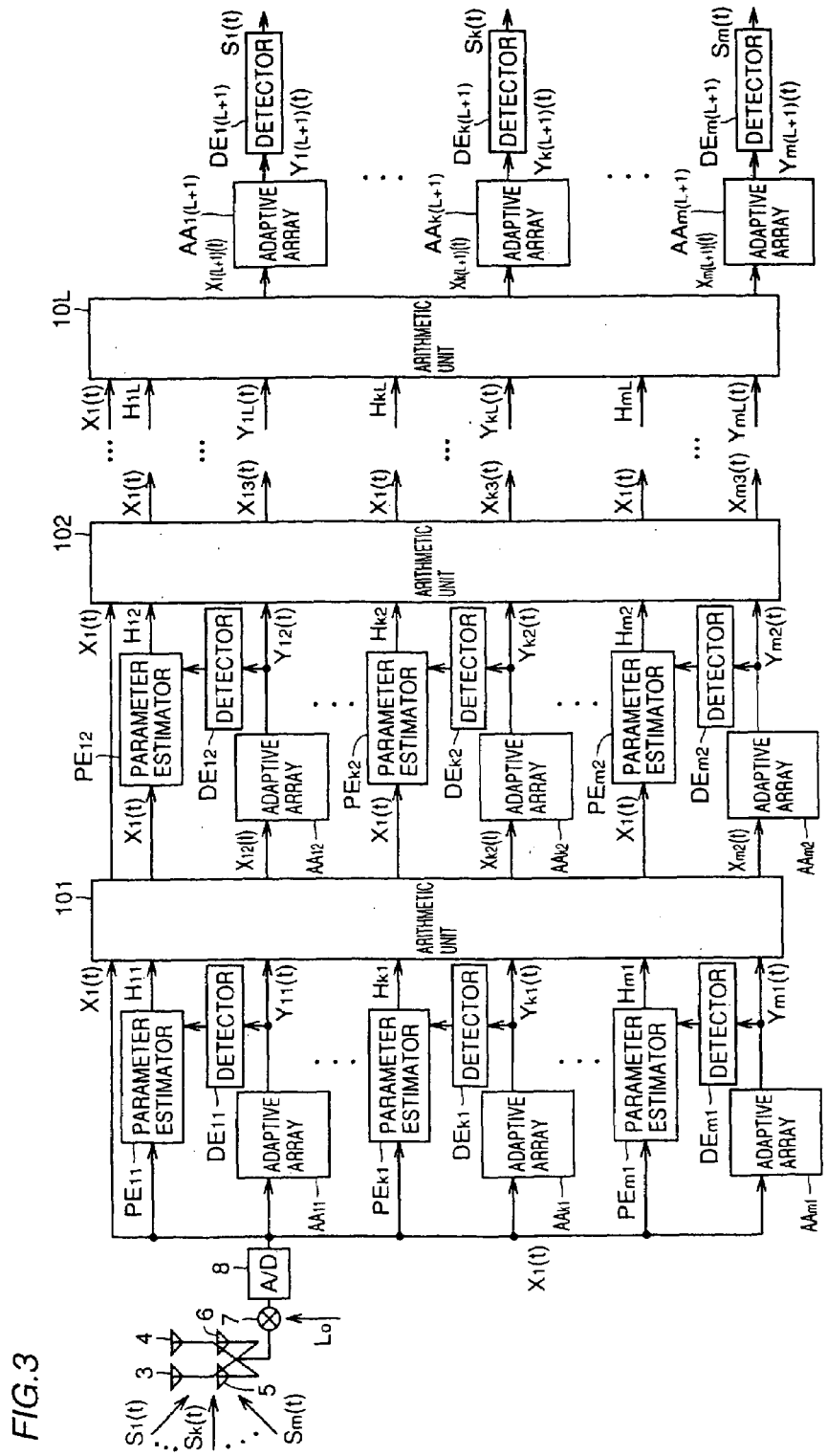
FIGS. 3 and 4 are block diagrams of a reception system of a base station for the PDMA according to a second embodiment and a third embodiment, respective, of the present invention.

FIG. 3 is a block diagram showing the second embodiment of the present invention. The embodiment of FIG. 3 further improves the property by providing in series a plurality of stages of user detection device, as well as detectors, each stage being formed of the adaptive arrays, the parameter estimators, and the arithmetic unit of FIG. 1 to reduce in a step-manner the ratio of the signal component of other users included in the user signal output from each stage. The operation of the circuit of each stage has been already described in detail with reference to FIGS. 1 and 2, and will not be repeated here.

Figure 4:
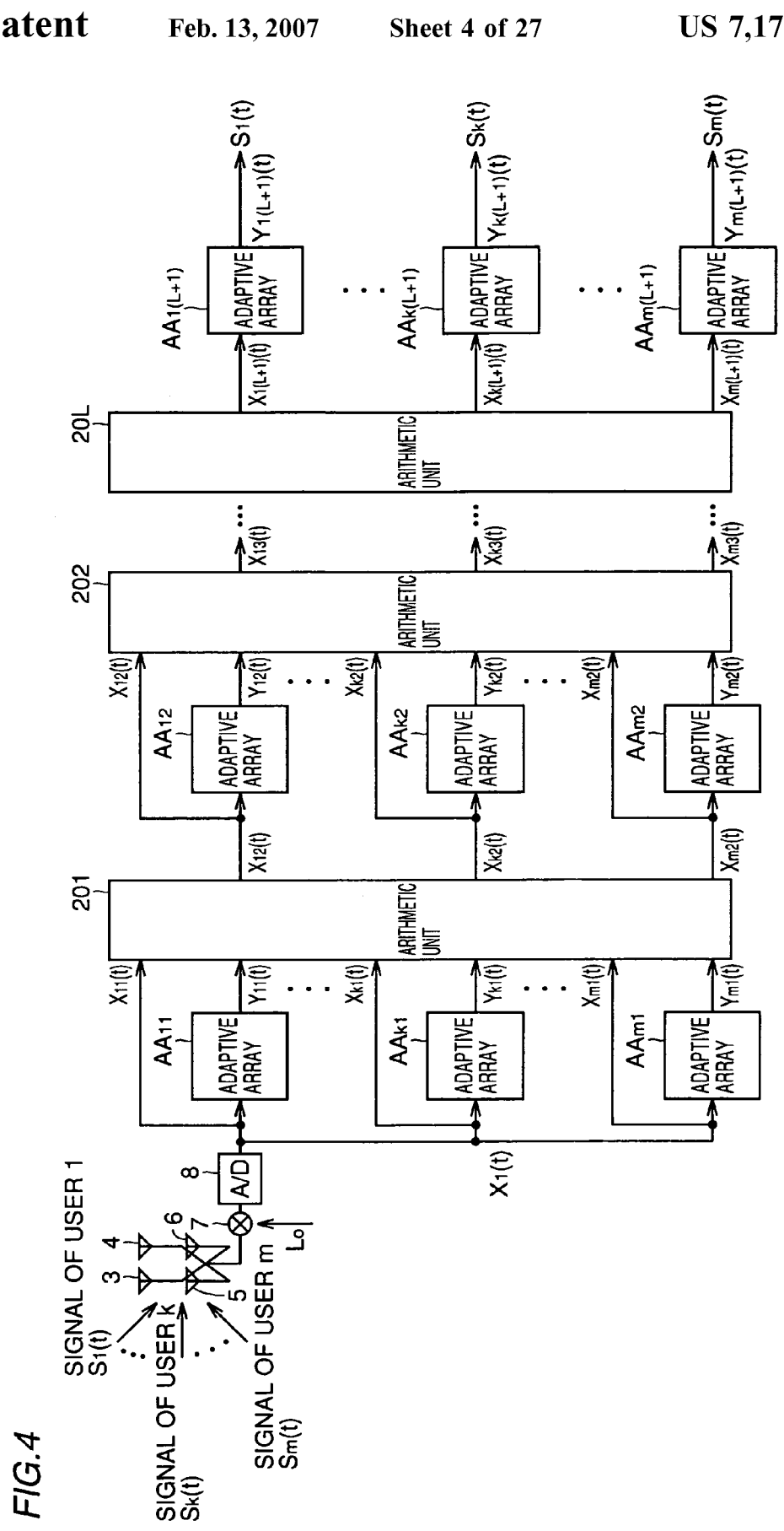

FIG. 4 is a block diagram showing the third embodiment of the present invention.

Referring to FIG. 4, input signal vector $X_1(t)$ output from A/D converter 8 is applied to adaptive arrays $AA_{11}, \ldots, AA_{k1}, \ldots, AA_{m1}$ and to arithmetic unit 201. Adaptive arrays $AA_{11}, \ldots, AA_{k1}, \ldots, AA_{m1}$ extract and provide to arithmetic unit 201 corresponding user signals $Y_{11}(t), \ldots, Y_{k1}(t), \ldots, Y_{m1}(t)$, respectively.

Figure 5:
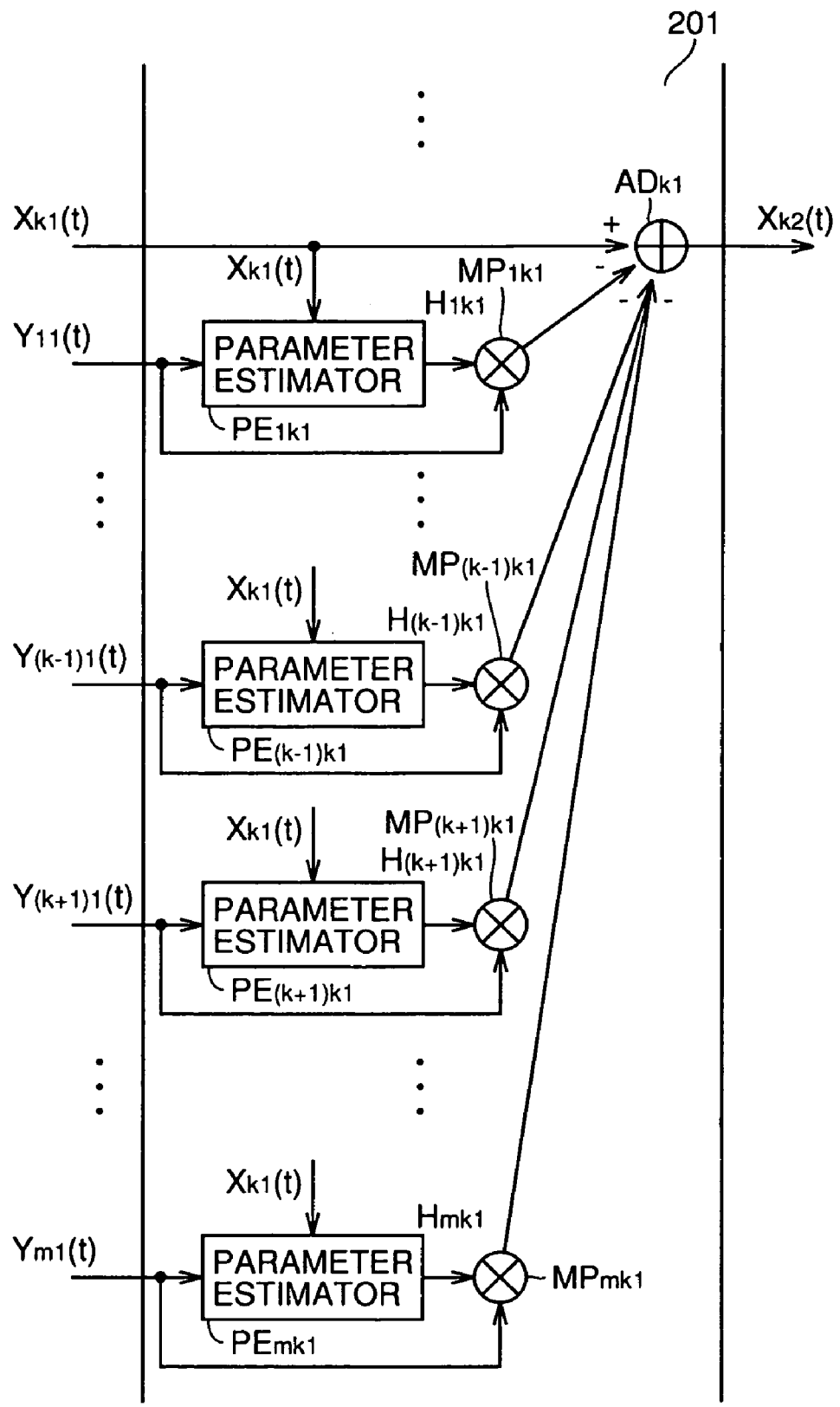
FIG. 5 is a block diagram showing a structure of the arithmetic unit of FIG. 4.

FIG. 5 is a specific block diagram of arithmetic unit 201 of FIG. 4. In FIG. 5, only the portion that carries out a signal process corresponding to user k is depicted out of the entire structure of arithmetic unit 201 for the sake of simplifying the description. The circuit of the same structure is provided corresponding to each of users 1, ..., k−1, k+1, ..., m besides user k.

The structure to generate input signal vector $X_{k2}(t)$ corresponding to user k will be described hereinafter with reference to FIG. 5. Arithmetic unit 201 includes parameter estimators $PE_{1k1}, \ldots, PE_{(k-1)k1}, PE_{(k+1)k1}, \ldots, PE_{mk1}$ and multipliers $MP_{1k1}, \ldots, MP_{(k-1)k1}, MP_{(k+1)k1}, \ldots, MP_{mk1}$ as the circuitry corresponding to user k.

Parameter estimators $PE_{1k1}, \ldots, PE_{(k-1)k1}, PE_{(k+1)k1}, \ldots, PE_{mk1}$ estimate reception signal coefficient vectors $H_{1k1}, \ldots, H_{(k-1)k1}, H_{(k+1)k1}, \ldots, H_{mk1}$ of corresponding users according to input signal vector $X_{k1}(t)$ and corresponding user signals $Y_{11}(t), \ldots, Y_{(k-1)1}(t), Y_{(k+1)1}(t), \ldots, Y_{m1}(t)$, respectively.

Multipliers $MP_{1k1}, \ldots, MP_{(k-1)k1}, MP_{(k+1)k1}, \ldots, MP_{mk1}$ receive user signals $Y_{11}(t), \ldots, Y_{(k-1)1}(t), Y_{(k+1)1}(t), \ldots, Y_{m1}(t)$ from adaptive arrays $AA_{11}, \ldots, AA_{(k-1)1}, AA_{(k+1)1}, \ldots, AA_{m1}$, and reception signal coefficient vectors $H_{1k1}, \ldots, H_{(k-1)k1}, H_{(k+1)k1}, \ldots, H_{mk1}$ from parameter estimators $PE_{1k1}, \ldots, PE_{(k-1)k1}, PE_{(k+1)k1}, \ldots, PE_{mk1}$.

The outputs of multipliers $MP_{1k1}, MP_{(k-1)k1}, MP_{(k+1)k1}, \ldots, MP_{mk1}$ are applied to the negative inputs of adder $AD_{k1}$. Input signal vector $X_{k1}(t)$ is applied to the positive inputs of adder $AD_{k1}$. Accordingly, the signal components corresponding to users other than user k are subtracted from input signal vector $X_{k1}(t)$, whereby the signal component $X_{k2}(t)$ corresponding to user k is output from adder $AD_{k1}$. As a result, the interference signal component will be removed considerably.

In the present embodiment, the user detection device of each stage is constituted by the adaptive arrays, the parameter estimators, and the remaining portion of the arithmetic unit. By connecting in series a plurality of stages of such user detection devices as shown in FIG. 4, removal of the interference component from the user signal is further facilitated.

A more specific operation of the embodiment shown in FIGS. 4 and 5 will be described hereinafter.

Assuming that there are n antenna elements and m users conversing at the same time as in the embodiment of FIG. 1, input signal vector $X_{k1}(t)$ of the k-th adaptive array $AA_{k1}$ and arithmetic unit 201 out of the circuitry forming the user detection device of the first stage is represented by the following equation (8).

$$X_{k1}(t) = [x_{1k1}(t), x_{2k1}(t), \ldots, x_{nk1}(t)]^T \quad (8)$$

$$x_{jk1}(t) = h_{j1k1}S_1(t) + h_{j2k1}S_2(t) + \ldots + h_{jik1}S_i(t) + \ldots + h_{jmk1}S_m(t) + n_{jk1}(t) \ (j=1, 2, \ldots, n) \quad (9)$$

The vector representation of the above equations (8) and (9) can be given by the following equation (10).

$$X_{k1}(t) = H_{1k1}S_1(t) + H_{2k1}S_2(t) + \ldots + H_{ik1}S_i(t) + \ldots + H_{mk1}S_m(t) + N(t) \quad (10)$$

$$H_{ik1} = [h_{1ik1}, h_{2ik1}, \ldots, h_{nik1}]^T, (i=1, 2, \ldots, m) \quad (11)$$

$$N_{k1}(t) = [n_{1k1}(t), n_{2k1},(t), \ldots, n_{nk1},(t)]^T \quad (12)$$

$H_{ik1}$ refers to the reception signal coefficient vector of the signal transmitted from user i included in the input signal vector of the circuit that extracts the signal transmitted from user k, out of the first stage of the user detection devices connected in series. $N_{k1}(t)$ refers to the noise vector included in the input signal vector of the circuit that extracts the signal transmitted from user k, out of the first stage of the user detection devices connected in series.

In parameter estimators $PE_{1k1}, \ldots, PE_{(k-1)k1}, PE_{(k+1)k1}, \ldots, PE_{mk1}$, the reception signal coefficient vector $H_{ik1}$ (i=1, 2, ..., m; where i≠k) of signal $S_i$ (t) (i=1, 2, ..., m; where i≠k) transmitted from user i included in input signal vector $X_{k1}$ (t) towards the adaptive array corresponding to user k and the arithmetic unit of the user detection device of the first stage can be estimated correctly. In the user detection device of the first stage, the i-th adaptive array operates relatively favorably, and can be regarded as $Y_{i1}$ (t)≈$S_i$ (t) (i=1, 2, ..., m; where i≠k).

In arithmetic unit 201 of FIG. 5, the signal component $S_i$ (t) (i=1, 2, ..., m; where i≠k) excluding signal $S_k$ (t) transmitted from user k included in input signal vector $X_{k1}$ (t) can be subtracted. As a result, output signal $X_{k2}$ (t) of arithmetic unit 201 is represented by the following equation (13).

$$X_{k2}(t)=X_{k1}(t)-H_{1k1}Y_{11}(t)-\ldots-H_{(k-1)k1}Y_{(k-1)1}(t)-H_{(k+1)k1}Y_{(k+1)1}(t)-\ldots-H_{mk1}Y_{m1}(t) \quad (13)$$

$$Y_{i1}(t)≈S_i(t), (i=1, 2, \ldots, m) \quad (14)$$

From the above equations (13) and (14), the following equation (15) is obtained.

$$X_{k2}(t)=X_{k1}(t)-H_{1k1}S_1(t)-\ldots-H_{(k-1)k1}S_{k-1}(t)-H_{(k+1)k1}S_{k+1}(t)-\ldots-H_{mk1}S_m(t) \quad (15)$$

Then, the following equation (16) is obtained from the above equation (15).

$$X_{k2}(t)=H_{kk1}S_k(t)+N_{k2}(t) \quad (16)$$

Therefore, $X_{k2}$ (t) is a signal vector having the signal component $S_i$ (t) (i=1, 2, ..., m; where i≠k) excluding $S_k$ (t) suppressed than $X_{k1}$ (t). Therefore, a user signal component $S_k$ (t) of a more accurate level can be calculated in the next stage of the user detection device.

Figure 6:
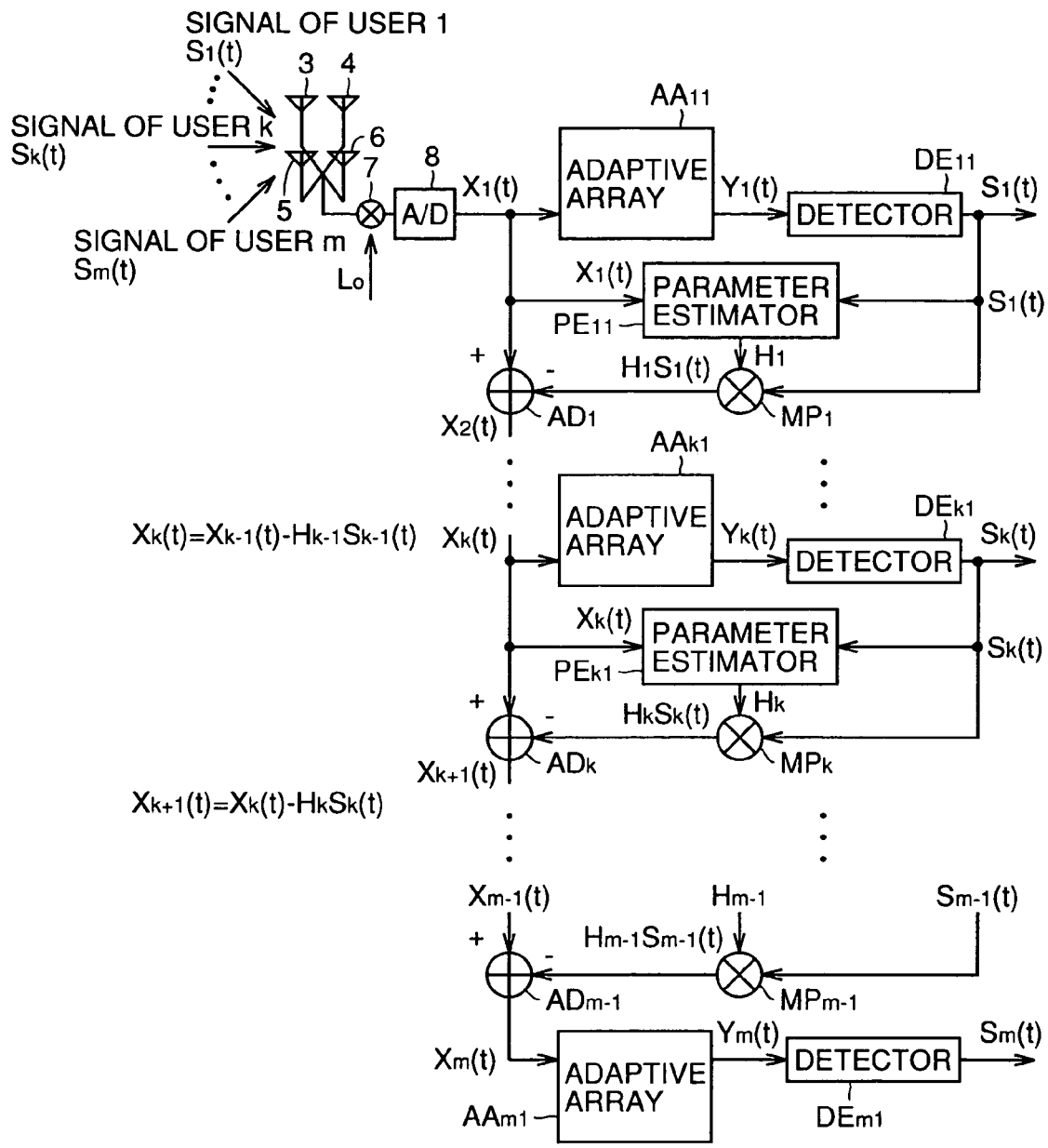
FIGS. 6, 7, and 8 are block diagrams of a reception system of a base station for the PDMA according to a fourth embodiment, a fifth embodiment, and a sixth embodiment, respectively, of the present invention.

FIG. 6 is a block diagram showing the reception system of a base station for the PDMA according to the fourth embodiment of the present invention. The fourth embodiment is directed to extract a more accurate user signal $S_{k+1}$ (t) in the user detection device of the next stage by using a signal vector obtained by multiplying the detected signal $S_k$ (t) of user k by the reception signal coefficient vector $H_k$ output from the parameter estimator and subtracting this multiplied value from the reception signal vector $X_k$ (t) used in the signal detection of user k in the user detection device of the k-th stage, as the input signal vector $X_{k+1}$ (t) of the adaptive array of the user detection device of the (k+1)th stage.

More specifically, input signal vector $X_1$ (t) output from A/D converter 8 is applied to adaptive array $AA_{11}$, and also to adder $AD_1$ and parameter estimator $PE_{11}$. User signal $Y_1$ (t) is extracted from input signal vector $X_1$ (t) by adaptive array $AA_{11}$ and detected by detector $DE_{11}$ to be output as user signal $S_1$ (t). User signal $S_1$ (t) is applied to parameter estimator $PE_{11}$ and multiplier $MP_1$.

Parameter estimator $PE_{11}$ estimates reception signal coefficient vector $H_1$ according to detected user signal $S_1$ (t) and input signal vector $X_1$ (t). Multiplier $MP_1$ multiplies reception signal coefficient vector $H_1$ by user signal $S_1$ (t) and provides the result to adder $AD_1$. The $H_1S_1$ (t) component is subtracted from input signal vector $X_1$ (t) by adder $AD_1$. The obtained signal vector is set as the input signal vector $X_2$ (t) of the user detection device of the next stage.

The user detection device of each stage is formed as the user detection device of the first stage. For example, the user detection device of the k-th stage includes an adaptive array $AA_{k1}$, a detector $DE_{k1}$, a parameter estimator $PE_{k1}$, a multiplier $MP_k$, and an adder $AD_k$. User signal $S_m$ (t) of user m is output via adaptive array $AA_{m1}$ and detector $DE_{m1}$ from adder $AD_{m-1}$ of the user detection device of the last stage (m-1 th) stage.

The operation of the fourth embodiment of FIG. 6 will be described hereinafter. Equations (1)–(5) described in the first embodiment of FIGS. 1 and 2 are also applied to the present fourth embodiment. Assuming that adaptive array $AA_{k1}$ extracting signal $S_{k1}$ (t) of user k shown in FIG. 6 operates favorably, the following equations are obtained.

$$Y_k(t)=a_kS_k(t)+a_{k+1}S_{k+2}(t)+\ldots+a_mS_m(t)+N_k(t) \quad (17)$$

$$a_k≈1, a_i≈0, (i=k+1, k+2, \ldots, m), |N_k(t)|<<|a_k| \quad (18)$$

Here, the output of detector $DE_{k1}$ of the user detection device of the k-th stage is $S_k$ (t).

Parameter estimator $PE_{k1}$ outputs a reception signal coefficient vector $H_k$ of the signal of user k according to the detected user signal $S_k$ (t) of user k and input signal vector $X_k$ (t). Multiplier $MP_k$ multiplies user signal $S_k$ (t) by reception signal coefficient vector $H_k$. The result is subtracted from input signal vector $X_k$ (t) by adder $AD_k$. The result is set as input signal vector $X_{k+1}$ (t) to the user detection device of the next stage. In other words, the following equation is obtained.

$$X_{k+1}(t)=X_k(t)-H_kS_k(t) \quad (19)$$

Inserting the previous equation (3) into equation (19), the following 20) is obtained.

$$X_{k+1}(t)=\{H_kS_k(t)+H_{k+1}S_{k+1}(t)+\ldots+H_mS_m(t)+N(t)\}-H_kS_k(t)=H_{k+1}S_{k+1}(t)+\ldots+H_mS_m(t)+N(t) \quad (20)$$

It is appreciated from equation (20) that input vector signal $X_{k+1}$ (t) is a vector signal having the component of user signal $S_k$ (t) (i. e., the interference signal component for adaptive array $AA_{(k+1)1}$ of the user detection device of the (k+1)th stage) from input signal vector $X_k$ (t) of the user detection device of the preceding stage. Therefore, the relevant adaptive array operates more favorably by using $X_{k+1}$ (t) than $X_k$ (t) as the input signal vector for adaptive array $AA_{(k+1)1}$ of the user detection device of the (k+1)th stage. As a result, a more proper signal $S_{k+1}$ (t) of user (k+1) can be extracted.

Figure 7:
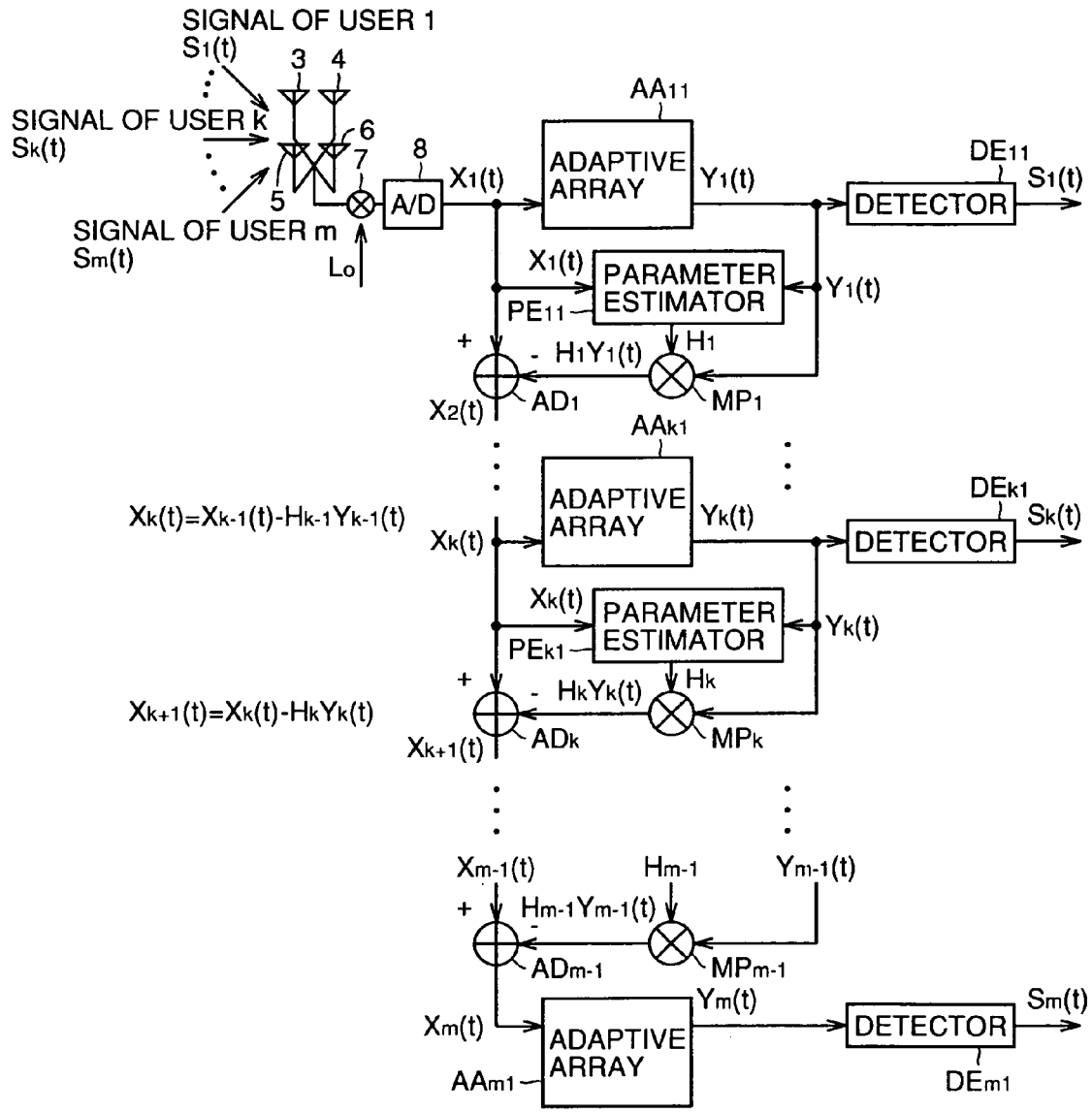

FIG. 7 is a diagram showing the fifth embodiment of the present invention which is a modification of the fourth embodiment shown in FIG. 6. In contrast to the embodiment of FIG. 6 in which detectors $DE_{11}, \ldots, DE_{k1}, \ldots, DE_{(m-1)1}$ are connected to the outputs of adaptive arrays $AA_{11}, \ldots, AA_{k1}, \ldots, AA_{(m-1)1}$, respectively, the modification shown in FIG. 7 has a structure in which user signals $Y_1$ (t) ..., $Y_k$ (t), ..., $Y_{m-1}$ (t) output from adaptive arrays $AA_{11}, \ldots, AA_{k1}, \ldots, AA_{(m-1)1}$ are applied to parameter estimators $PE_{11}, \ldots, PE_{k1}, \ldots, PE_{(m-1)1}$ and multipliers $MP_1, \ldots, MP_k, \ldots, MP_{m-1}$.

Parameter estimators $PE_{11}, \ldots, PE_{k1}, \ldots, PE_{m-1}$ output reception signal coefficient vectors $H_1, \ldots, H_k, \ldots H_{m-1}$ of the first stage, ..., the (k)th stage, ..., the (m-1)th stage from user signals $Y_1$ (t), ..., $Y_k$ (t), ..., $Y_{m-1}$ (t) and input signal vectors $X_1$ (t), ..., $X_k$ (t), ..., $X_{m-1}$ (t).

Multipliers $MP_1, \ldots, MP_k, \ldots, MP_{m-1}$ multiply reception signal coefficient vectors $H_1, \ldots, H_k, \ldots, H_{m-1}$ by user signals $Y_1$ (t), ..., $Y_k$ (t), ..., $Y_{m-1}$ (t). Adders $AD_1, \ldots, AD_k, \ldots, AD_{m-1}$ subtract $H_1Y_1$ (t), ..., $H_kY_k$ (t), ..., $H_{m-1}Y_{m-1}$ (t) which are the multiplied result from input signal vectors $X_1$ (t), ..., $X_k$ (t), ..., $X_{m-1}$ (t). The remaining operation is identical to the operation of the previous embodiment of FIG. 6.

Figure 8:
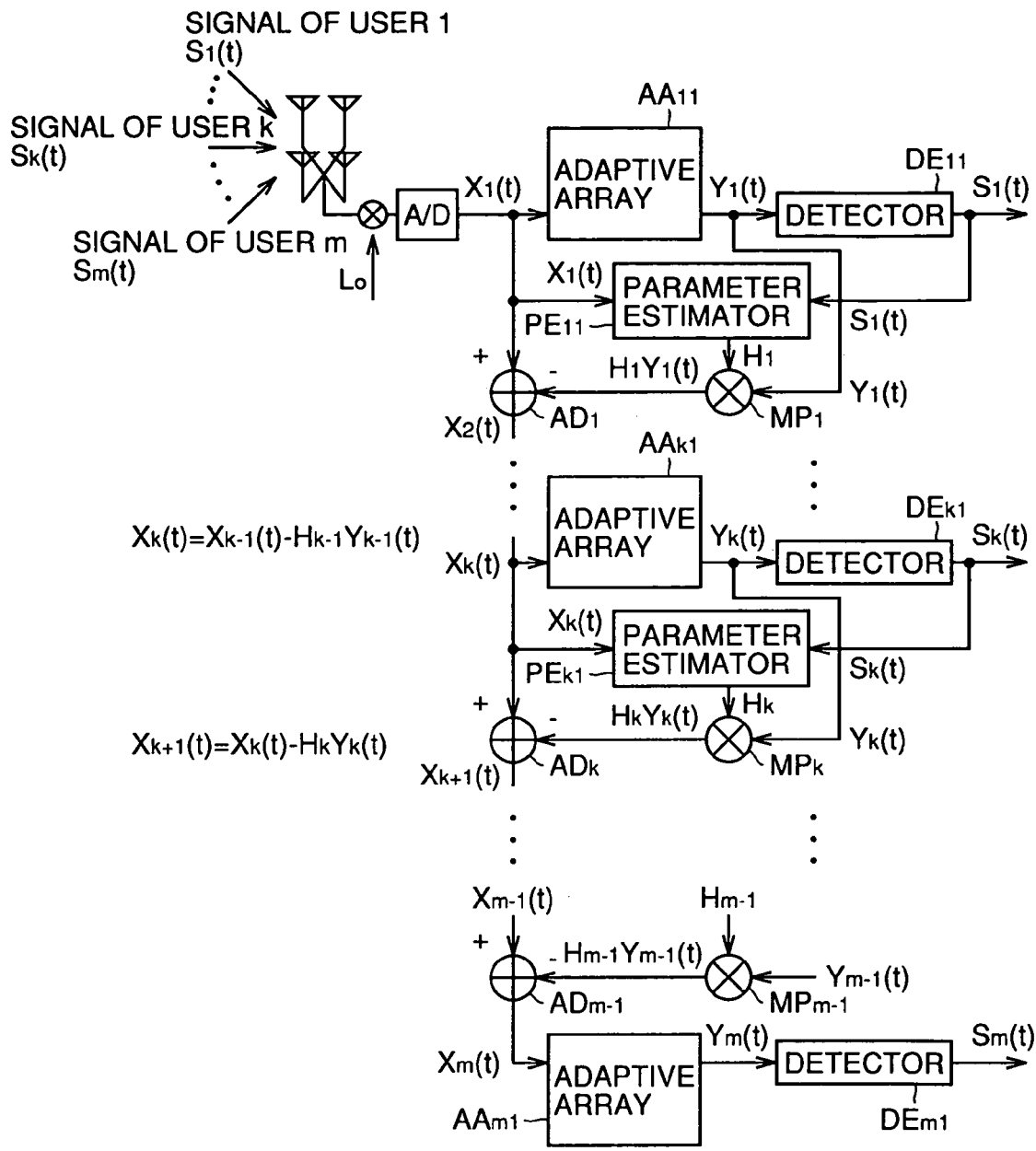

FIG. 8 shows the sixth embodiment of the present invention which is a modification of the fourth embodiment of FIG. 6. In the sixth embodiment, user signals $Y_1(t), \ldots, Y_k(t), \ldots, Y_{m-1}(t)$ output from adaptive arrays $AA_{11}, \ldots, AA_{k1}, \ldots, AA_{(m-1)1}$ are applied to multipliers $MP_1, \ldots, MP_k, \ldots, MP_{m-1}$ instead of user signals $S_1(t) \ldots, S_k(t) \ldots, S_{m-1}(t)$ of FIG. 6. The remaining structure is similar to that of the sixth embodiment of FIG. 6.

In the present sixth embodiment, a signal $S_{k+1}(t)$ of a more correct level of user k+1 can be extracted by using the signal vector obtained by multiplying the detected signal $Y_k(t)$ of user k by reception signal coefficient vector $H_k$ output from the parameter estimator and subtracting the multiplied value from input signal vector $X_k(t)$ used in the user detection device of the k-th stage, as input signal vector $X_{k+1}(t)$ of adaptive array $AA_{(k+1)a}$ of the user detection device of the (k+1)th stage.

Figure 9:
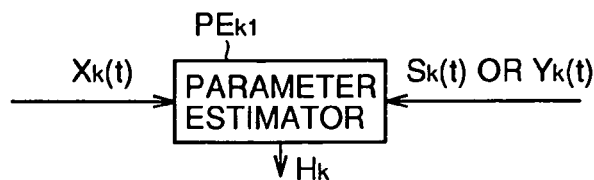
FIG. 9 is a diagram for describing an operation of the parameter estimator employed in the present invention.

FIG. 9 is a diagram to describe the operation of the parameter estimator used in each of the above embodiments. In a reception system with n antenna elements and m users connected in path multiplex, input signal vector $X_k(t)$ of the k-th parameter estimator $PE_{k1}$ connected in parallel is represented by the following equation (21).

$$X_k(t)=[x_{1k}(t), x_{2k}(t), \ldots, x_{nk}(t)]^T \quad (21)$$

$$x_{jk}(t)=h_{jk}S_k(t)+h_{jk+1}S_{k+1}(t)+ \ldots +h_{jm}S_m(t)+ \ldots +n_j(t), (k=1, 2, \ldots, n) \quad (22)$$

A vector representation of the above equations (21) and (22) gives the following equations.

$$X_1kt)=H_kS_k(t)+H_{k+1}S_{k+1}(t)+ \ldots +H_mS_m(t)+N(t) \quad (23)$$

$$H_i=[h_{1i},h_{2i}, \ldots, h_{ni}]^T, (i=k, k+1, \ldots m) \quad (24)$$

$$N(t)=[n_1(t), n_2(t), \ldots, n_n(t)]^T \quad (25)$$

Here, the ensemble average between input signal vector $X_k(t)$ corresponding to user k and user signal $S_k(t)$ (the time average of multiplication of $X_k(t)$ by $S_k(t)$) is calculated. In the calculation, the output signal $Y_k(t)$ of the k-th adaptive array $AA_{k1}$ can be used instead of user signal $S_k(t)$ of user k since $Y_k(t) \approx S_k(t)$ is established. The ensemble average is calculated by the following equation (26).

$$E[X_k(t)S_k(t)]=[E[x_{1k}(t)S_k(t)], E[x_{2k}(t)S_k(t)], \ldots E[x_{nk}(t)S_k(t)]]^T \quad (26)$$

Calculation of the ensemble average for each element gives the following equation.

$$E[x_{jk}(t)S_k(t)]=h_{jk}E[S_k(t)S_k(t)]+h_{jk+1}E[S_{k+1}(t)S_k(t)]+ \ldots +h_{jm}E[S_m(t)S_k(t)]+E[n_j(t)S_k(t)], (j=1, 2, \ldots, n) \quad (27)$$

Here, $E[\cdot]$ implies the ensemble average of $[\cdot]$. Since there is no correlation between user signal $S_k(t)$ and the other user signal $S_i(t)$ (i=k+1, \ldots, m), and there is no correlation between user signal $S_k(t)$ and noise signal $N_i(t)$, the ensemble average is represented by the following equations where the average time is long enough.

$$E[S_k(t)S_k(t)]=1 \quad (28)$$

$$E[S_i(t)S_k(t)]=0, (i=k+1, k+2, \ldots m) \quad (29)$$

$$E[n_j(t)S_k(t)]=0, (j=1, 2, \ldots, n) \quad (30)$$

Therefore, $$E[x_{jk}(t)S_k(t)]=h_{jk}, (j=1, 2, \ldots, n) \quad (31)$$

$$E[X_k(t)S_k(t)]=[h_{1k}, h_{2k}, \ldots, h_{nk}]^T=H_k \quad (32)$$

Thus, reception signal coefficient vector $H_k$ of signal $S_k(t)$ of user k is calculated. In other words, reception signal coefficient vector $H_k$ of the user signal of user k can be obtained by calculating the ensemble average between input signal vector $X_k(t)$ of user k and the detected signal $S_k(t)$ of user k by the parameter estimator $PE_{k1}$.

Figure 10:
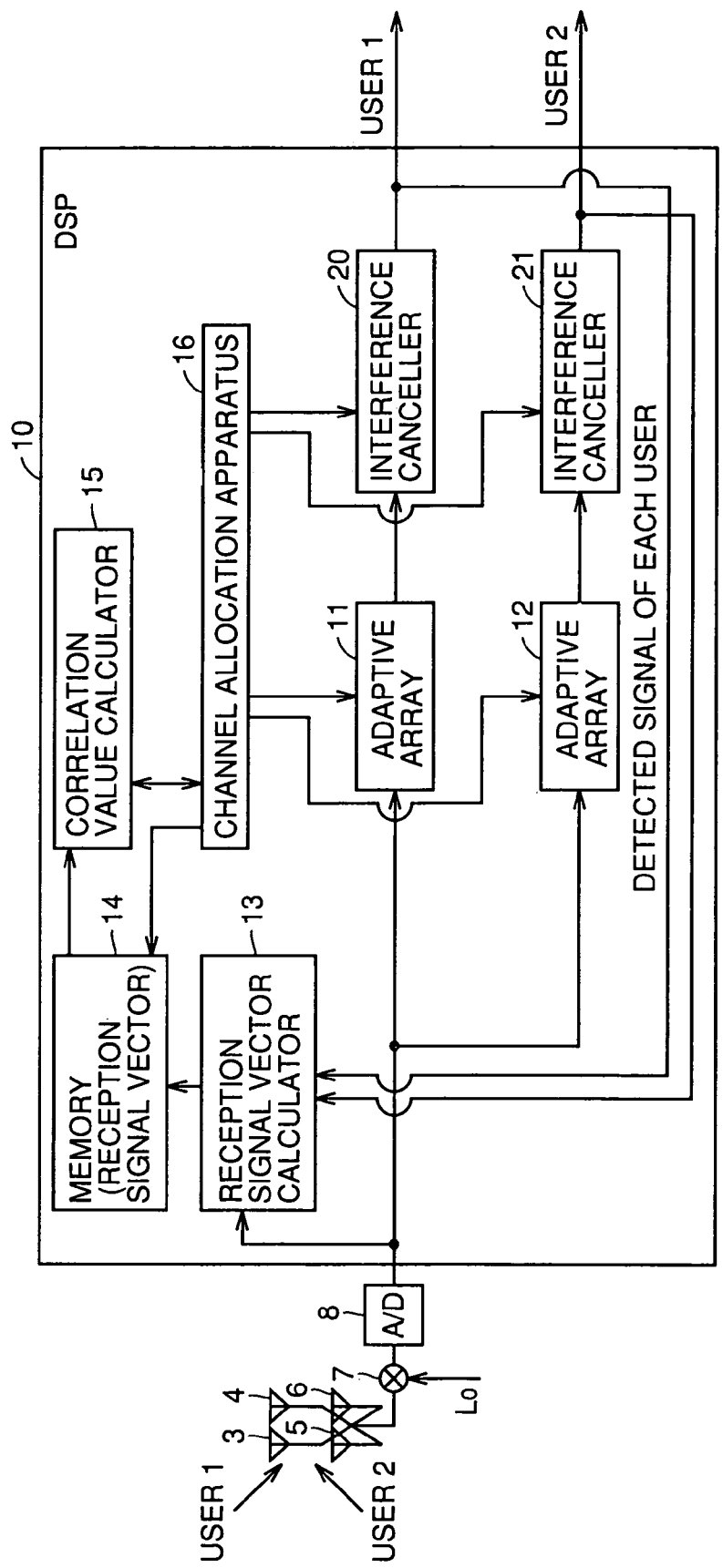
FIG. 10 is a block diagram of a reception system of a base station for the PDMA according to a seventh embodiment of the present invention.

FIG. 10 is a block diagram showing the reception system of a base station for the PDMA according to the seventh embodiment of the present invention. In the present embodiment of FIG. 7, interference cancellers 20 and 21 are connected to the outputs of the conventional adaptive arrays 11 and 12, respectively, shown in FIG. 28. The user signals output from interference cancellers 20 and 21 are fed back to reception signal vector calculator 13. The remaining structure is identical to the structure of FIG. 28. Therefore, the description of common components will not be repeated.

In FIG. 10, the desired user signal, interference user signal, and noise are included in the signal extracted by each of adaptive arrays 11 and 12. The power of the desired user signal is greatest among these signals. Each of interference cancellers 20 and 21 estimates the interference user signal using the preamble which is the known signal component included in the interference user signal to remove the interference user signal component included in the signal extracted by corresponding adaptive arrays 11 and 12. Thus, a desired signal component is output from DSP 10 with the interference component further suppressed.

Figure 11:
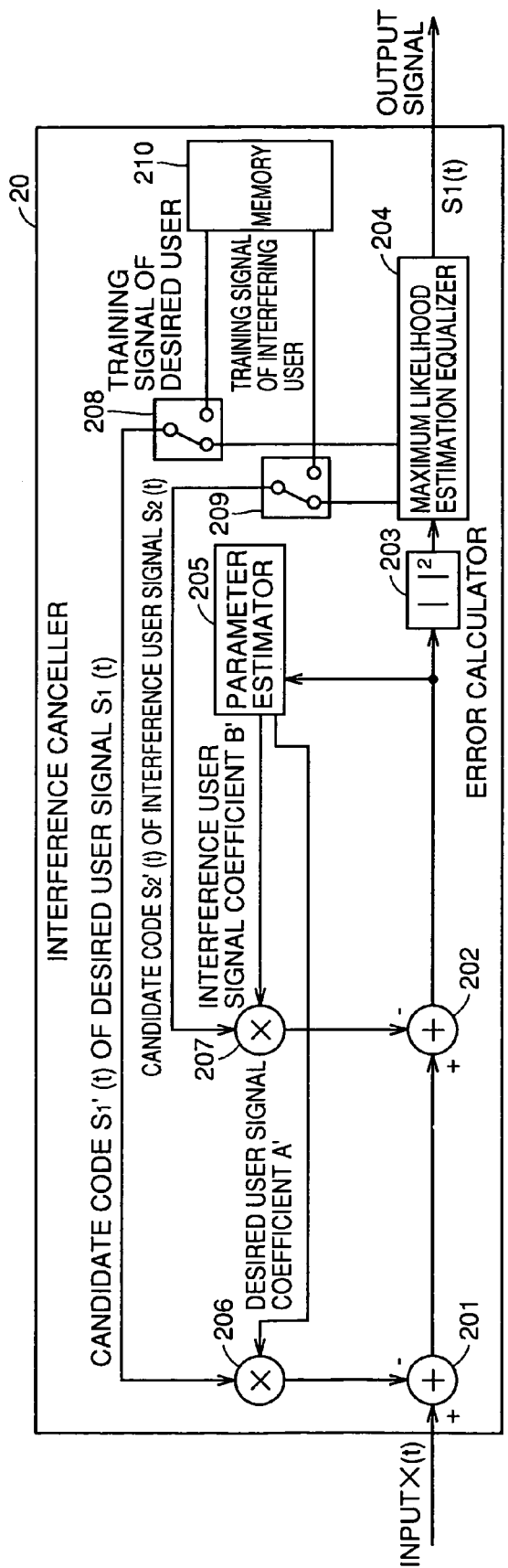
FIG. 11 is a block diagram showing a structure of an interference canceller of FIG. 10.

FIG. 11 is a block diagram showing a structure of the interference canceller of FIG. 10. Referring to FIG. 11, interference canceller 20 includes adders 201 and 202, an error calculator 203, a maximum likelihood estimation equalizer 204, a parameter estimator 205, multipliers 206 and 207, switches 208 and 209, and a memory 210.

Assuming that the number of path multiplex of interference canceller 20 is 2, the signal of user 1 is $S_1(t)$, the signal of user 2 is $S_2(t)$, the noise component included in the input signal is n (t), the coefficient of the signal of user 1 included in the input signal is A, and the coefficient of the signal of user 2 is B, input signal x (t) is represented by the following equation.

$$x(t)=AS_1(t)+BS_2(t)+n(t)$$

Parameter estimator 205 estimates the values of coefficients A and B according to the input signal. Error calculator 203 calculates the absolute value of signal Y (t) that is input to error calculator 203. Signal Y (t) applied to error calculator 203 is represented by the following equation.

$$Y(t)=AS_1(t)-A'S_1'(t)+BS_2(t)-B'S_2'(t)+n(t)$$

When candidate signals $S_1'(t)$ and $S_2'(t)$ specified in maximum likelihood estimation equalizer 204 match the transmitted signals $S_1(t)$ and $S_2(t)$, and the parameters (A', B') estimated by parameter estimator 205 match the true values (A, B), Y (t)=n (t) is established, so that the input signal of error calculator 203 is minimum.

Maximum likelihood estimation equalizer 204 selects the series of signals with the smallest error and outputs that signal. Switches 208 and 209 switch the input signal between the training period and the data period for output. During the training period, the estimation accuracy of the coefficient estimated by parameter estimator 205 is improved using the training signal stored in memory 210. During the data period, the input is switched to the maximum likelihood estimation equalizer 204 side. The signal series with the smallest error is searched by using the code sequentially specified by maximum likelihood estimation equalizer 204.

Figure 12:
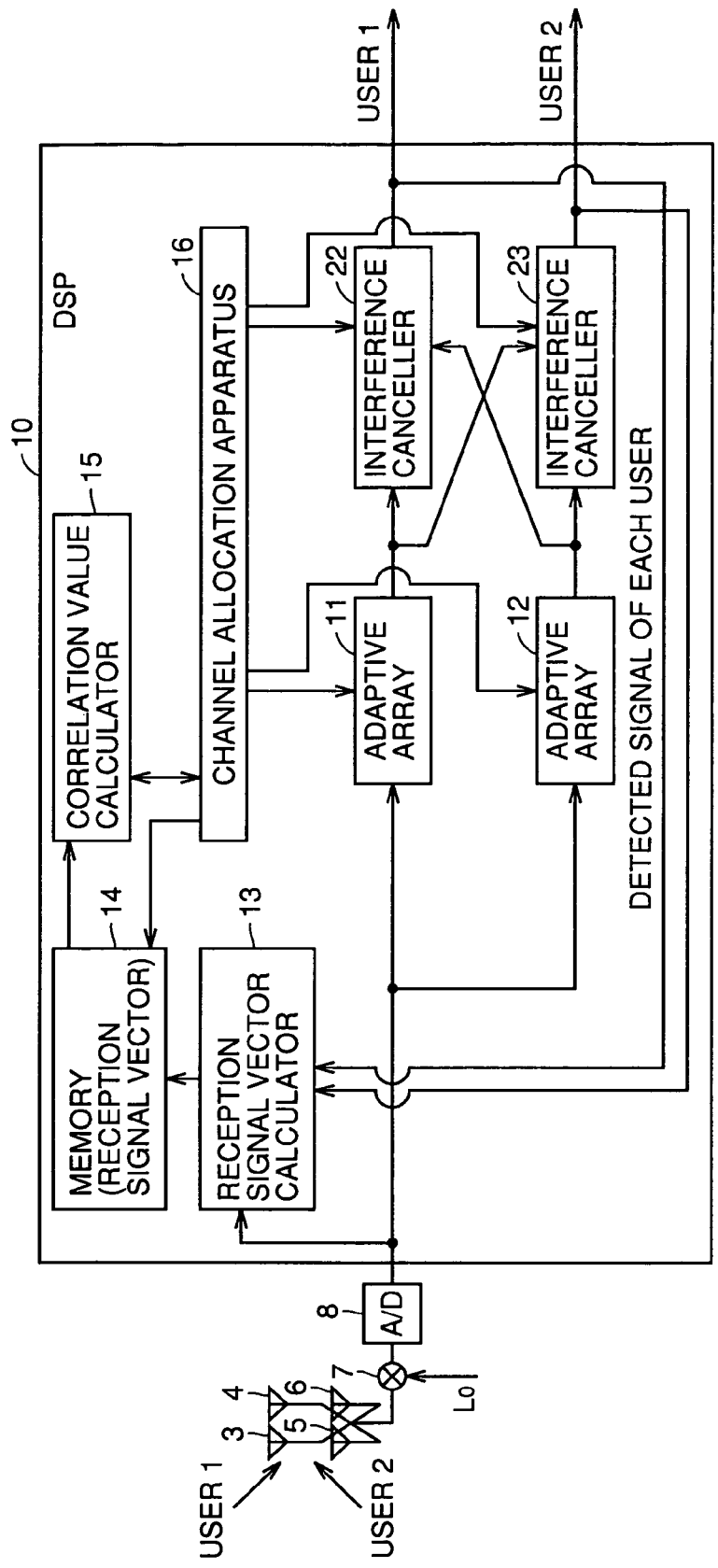
FIG. 12 is a block diagram of a reception system of a base station for the PDMA according to an eighth embodiment of the present invention.
Figure 13:
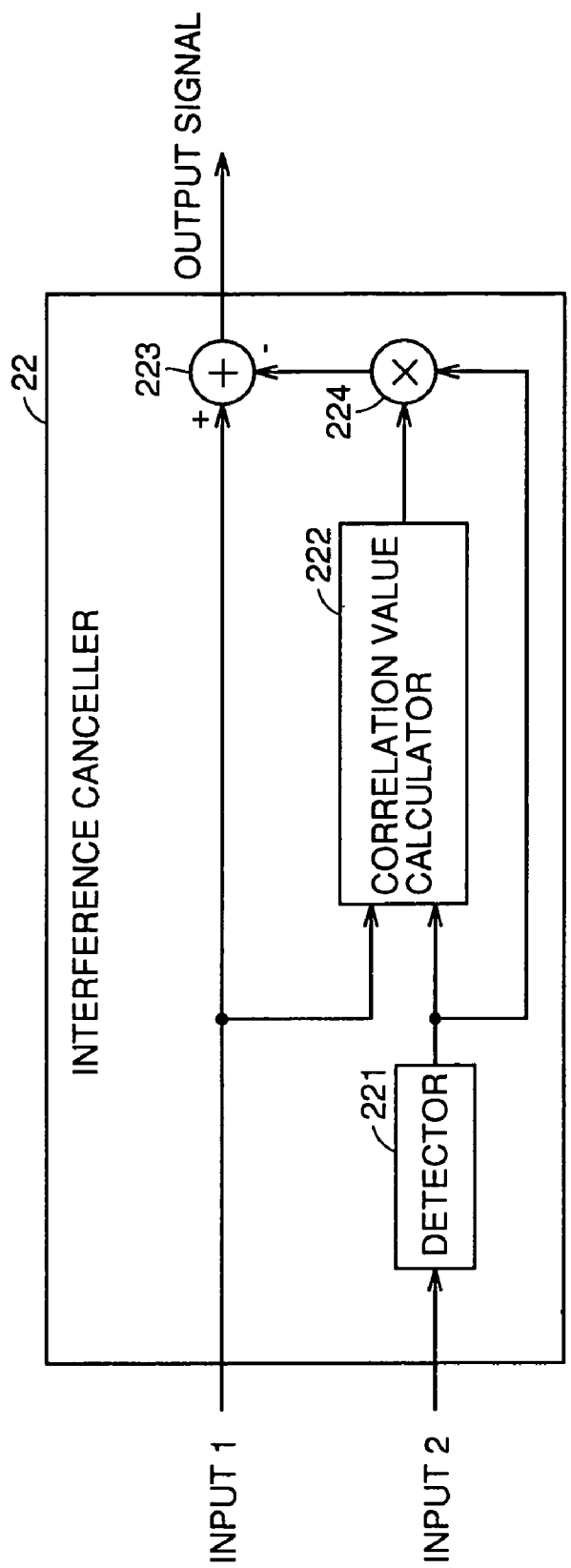
FIG. 13 is a schematic block diagram of the interference canceller of FIG. 12.

FIG. 12 is a block diagram showing a structure of a reception system of a base station for the PDMA according to the eighth embodiment of the present invention. FIG. 13 is a schematic block diagram of the interference canceller of FIG. 12.

Referring to the reception system of FIG. 12, interference cancellers 22 and 23 are provided instead of interference cancellers 20 and 21 of the embodiment shown in FIG. 10. The signal extracted by adaptive array 11 is applied to interference canceller 22 as a desired user signal and to interference canceller 23 as an interference user signal. The signal extracted by adaptive array 12 is applied to interference canceller 23 as a desired user signal and to interference canceller 23 as an interference user signal. Interference canceller 22 includes a detector circuit 221, a correlation value calculator 222, an adder 223, and a multiplier 224, as shown in FIG. 13.

Here, the number of users of path multiplex in interference canceller 22 of FIG. 13 is 2, the signal of input 1 is $X_1$ (t), the signal of input 2 is $X_2$ (t), the output signal of detector circuit 221 is $X_3$ (t), and the output signal is Y (t).

Also, the signal of user 1 of FIG. 13 is $S_1$ (t), the signal of user 2 is $S_2$ (t), the noise component included in the signal of input 1 is $n_1$ (t), the noise component included in the signal of input 2 is $n_2$ (t), the coefficient of the signal of user 1 included in the signal of input 1 is A, the coefficient of the signal of user 2 included in the signal of input 1 is B, the coefficient of the signal of user 1 included in the signal of user 2 is C, and the coefficient of the signal of user 2 included in the signal of input 2 is D, the two input signals $x_1$ (t), $x_2$ (t) are represented by the following equations, respectively.

$$x_1(t)=AS_1(t)+BS_2(t)+n_1(t)$$

$$x_2(t)=CS_1(t)+DS_2(t)+n_2(t)$$

Since the two input signals $x_1$ (t), $x_2$ (t) are the output signals of adaptive arrays 11 and 12, the following conditions are established.

$$A\approx 1, D\approx 1$$

$$A>>B, C<<D$$

$$S_1(t), S_2(t)>>n_1(t), n_2(t)$$

Upon detecting signal $x_2$ (t) of input 2, the obtained signal $x_3$ (t) is represented by the following equation.

$$x_3(t)=S_2(t)$$

The valve of ensemble average between signal $x_3$ (t) and signal $x_1$ (t) of input 1 is calculated as below.

$$E[x_1(t)x_3(t)]=AE[S_1(t)S_2(t)]+BE[S_2(t)S_2(t)]+E[n_1(t)S_2(t)]$$

Here, the following relationships are established.

$$E[S_1(t)S_2(t)]=0$$

$$E[S_2(t)S_2(t)]=1$$

$$E[n_1(t)S_2(t)]=0$$

The value of ensemble average between signals $x_1$ (t) and $x_3$ (t) is represented as below.

$$E[x_1(t)x_2(t)]=B$$

Therefore, output signal Y (t) is represented by the following equation.

$$Y(t)=x_1(t)-x_3(t)*E[x_1(t)x_3(t)]=AS_1(t)+BS_2(t)+n_1(t)-BS_2(t)=AS_1(t)+n_1(t)$$

Thus, interference user component $x_2$ (t) is removed from signal $x_1$ (t) of input 1.

Figure 14:
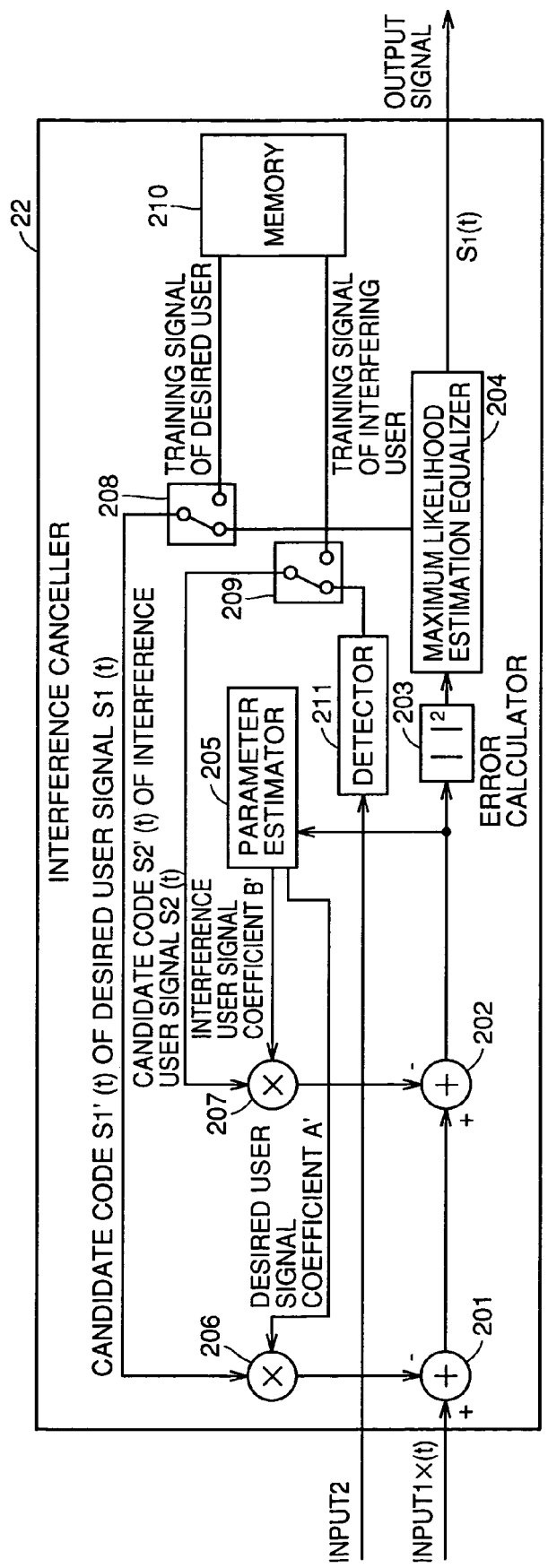
FIG. 14 is a block diagram showing another example of the interference canceller of FIG. 12.

FIG. 14 is a block diagram showing another example of the interference canceller of FIG. 12. Interference canceller 22 of FIG. 14 has a configuration in which a detector 211 is provided in the interference canceller of FIG. 11. In contrast to the structure of interference canceller 20 of FIG. 11 in which maximum likelihood estimation equalizer 204 specifies candidate signal $S_2'$ (t) of interference user signal $S_2$ (t), interference canceller 22 of FIG. 14 provides the detected output of detector 211 as interference user signal $S_2$ (t) to multiplier 207 via switch 209. The remaining structure and operation are similar to those of the previous embodiment described with reference to FIG. 11.

Figure 15:
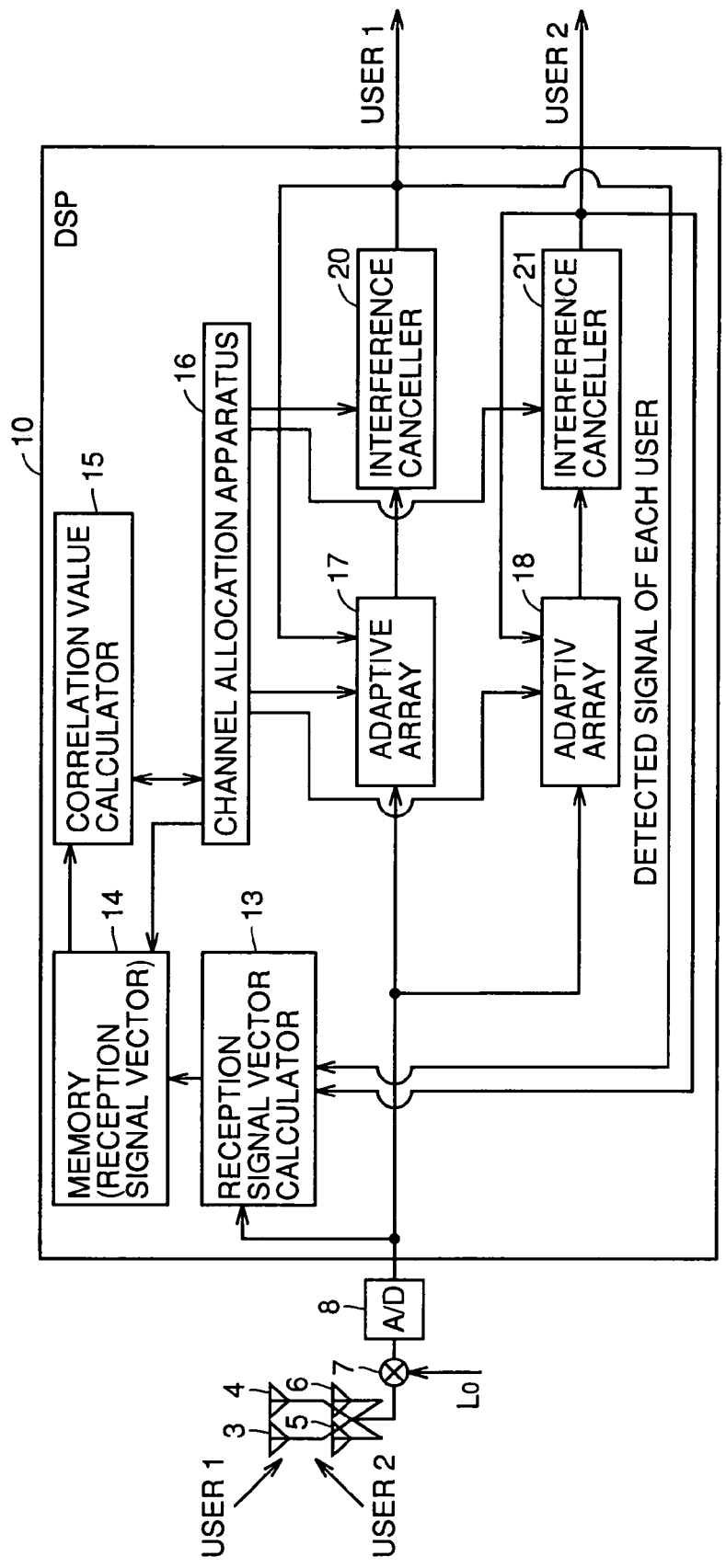
FIGS. 15 and 16 are block diagrams of a reception system of a base station for the PDMA according to a ninth embodiment and a tenth embodiment, respectively, of the present invention.

FIG. 15 is a block diagram showing a reception system of a base station for the PDMA according to the ninth embodiment of the present invention. In the present embodiment, adaptive arrays 17 and 18 are provided instead of adaptive arrays 11 and 12 of FIG. 10. Training signals are fed back to adaptive arrays 17 and 18 by interference cancellers 20 and 21, respectively. The remaining structure is identical to that of the embodiment of FIG. 10.

The number of times of feeding back training signals from the interference cancellers to the adaptive array, i.e. the number of times of operating adaptive arrays 17 and 18 and interference cancellers 20 and 21, is determined in advance. Alternatively, the required number of times is conducted until a predetermined communication quality is achieved.

Figure 16:
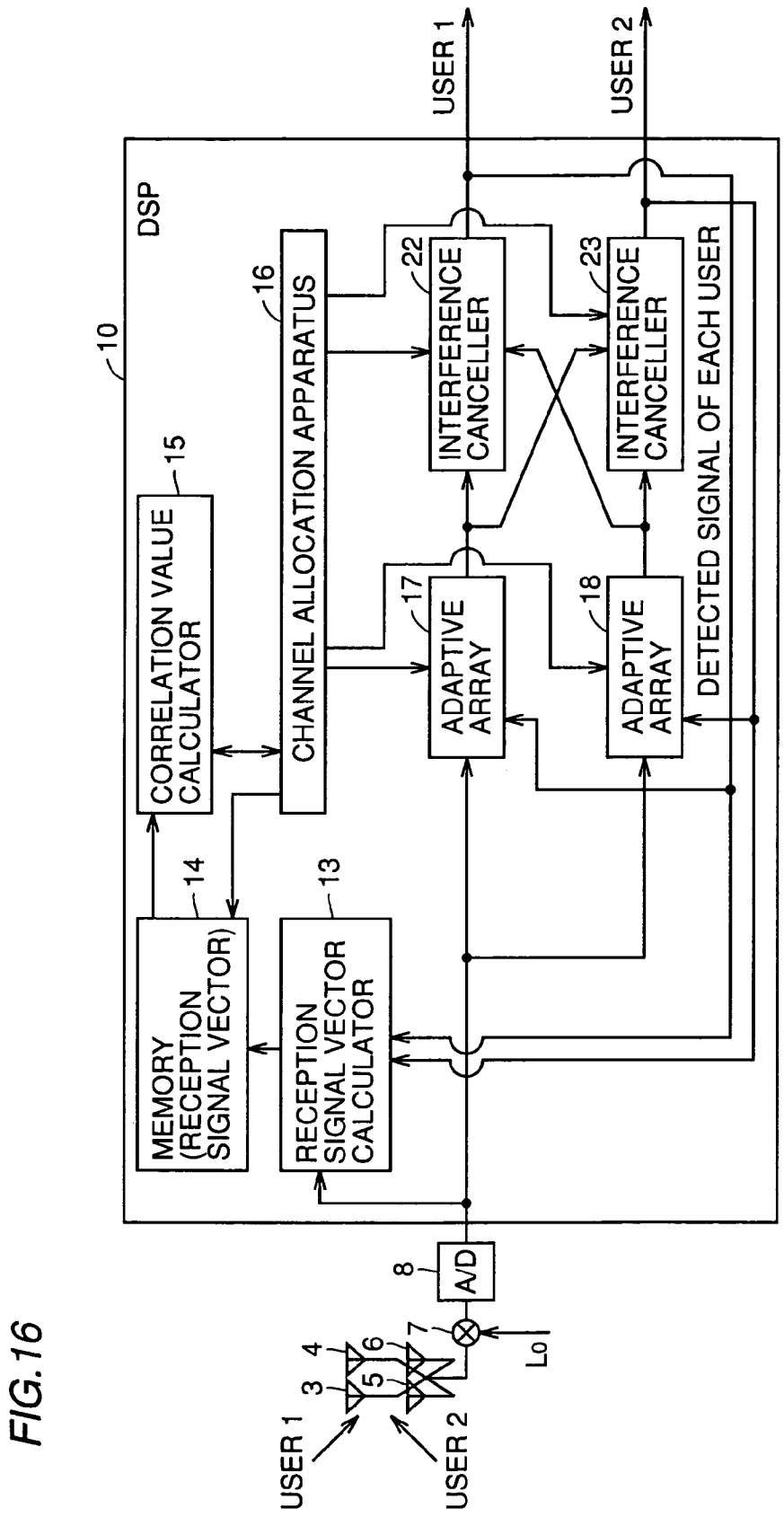

FIG. 16 is a block diagram showing a reception system of a base station for the PDMA according to the tenth embodiment of the present invention. The present tenth embodiment has a structure in which interference cancellers 20 and 21 shown in FIG. 15 are substituted with interference cancellers 22 and 23 shown in FIG. 12. Similarly in the present embodiment, interference canceller 22 removes the interference user signal component included in the signal extracted by adaptive array 17 according to the signals extracted from adaptive arrays 17 and 18, so that the signal component of a desired user 1 can be output with the interference component more suppressed. Similarly, the other interference canceller 23 can output the signal component of a desired user 2 with the interference component more suppressed.

Figure 17:
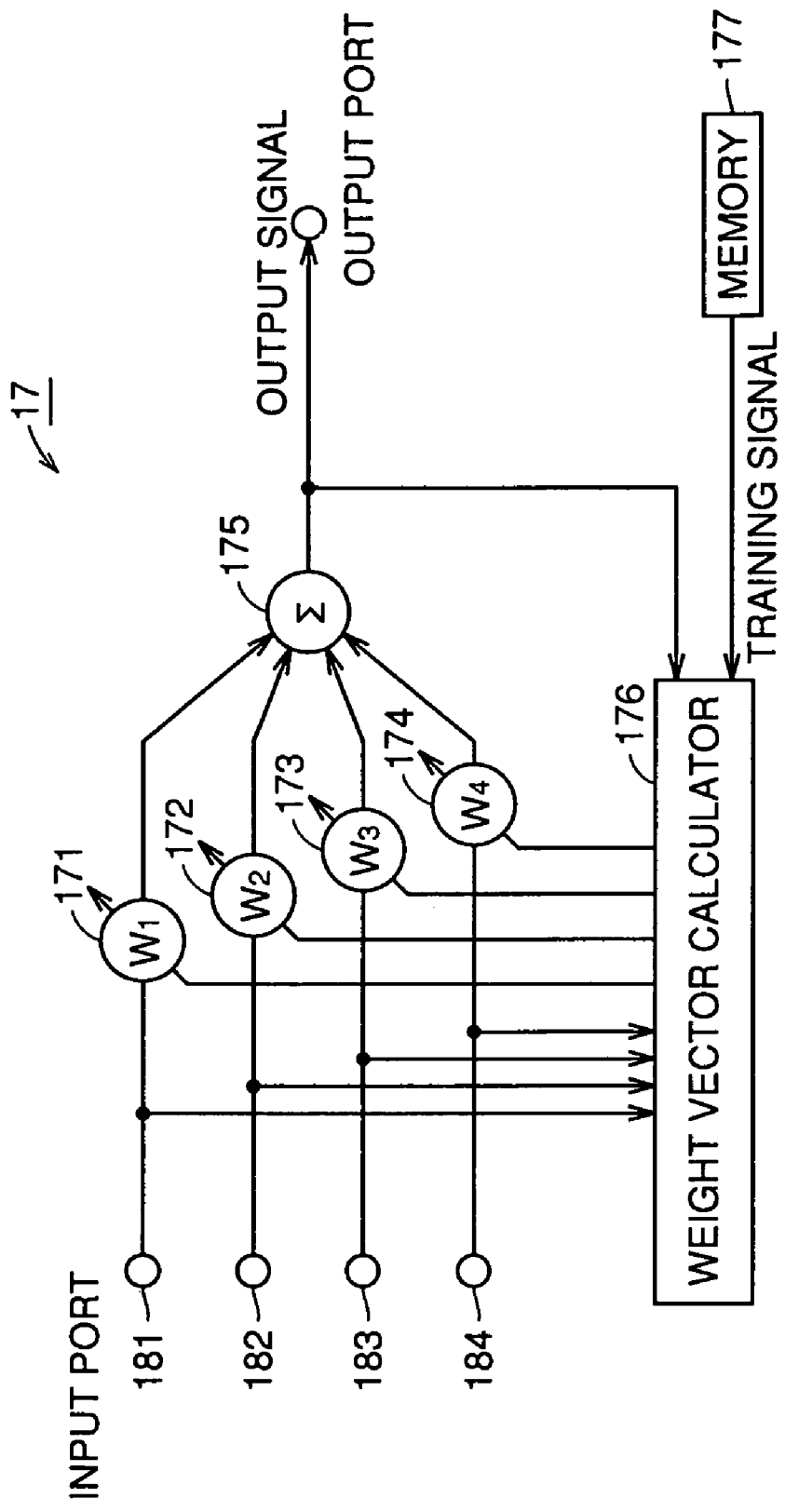
FIG. 17 is a block diagram showing the process of the first loop in an example of an adaptive array.
Figure 18:
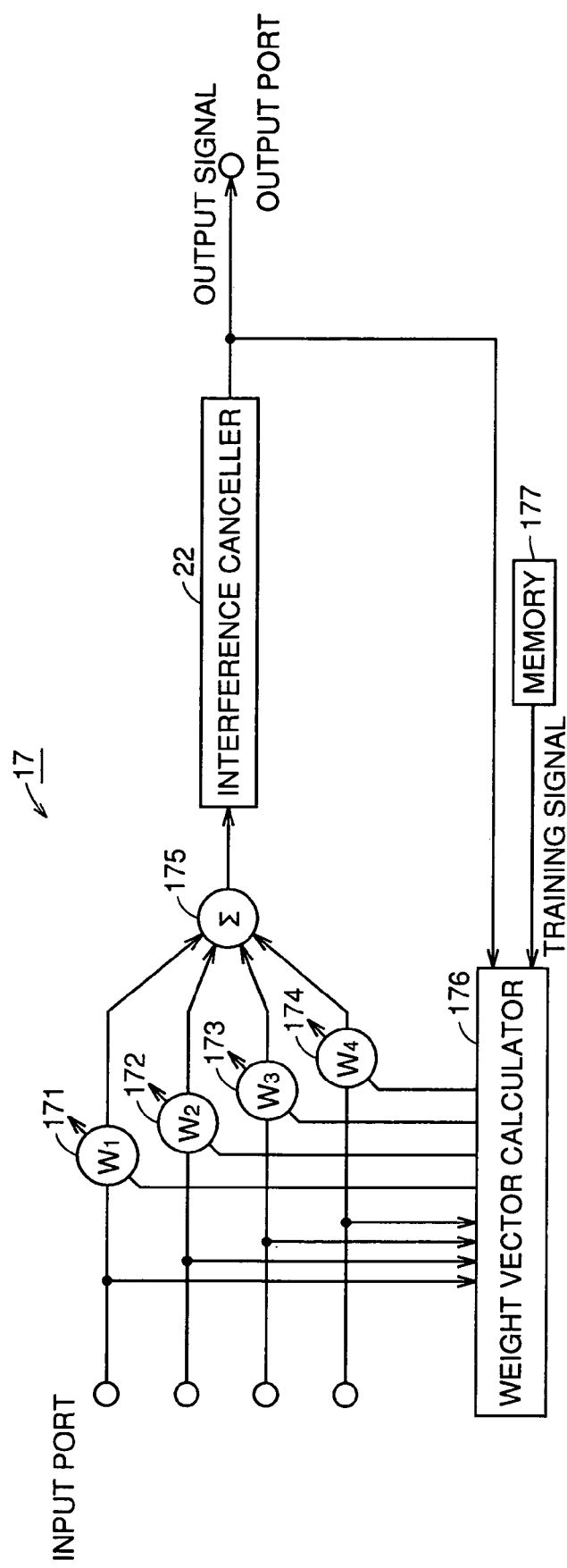
FIG. 18 is a block diagram showing the process of the second and subsequent loops in an example of an adaptive array.

FIGS. 17 and 18 are block diagrams showing examples of adaptive arrays 17 and 18 in each of the above embodiments. Particularly, FIG. 17 is a block diagram showing the signal processing of the adaptive array in the first loop whereas FIG. 18 is a block diagram showing the signal processing in the adaptive array from the second and subsequent loops.

Referring to FIGS. 17 and 18, input ports 181–184 are provided in each adaptive array. The input signals from the four antennas 3–6 that are A/D converted by A/D converter 8 are applied to respective input ports. These input signals are applied to a weight vector calculator 176 and multipliers 171–174.

Weight vector calculator 176 provides weight vectors $w_1$–$w_4$ using the input signals from input ports 180–184 and the training signal corresponding to the signal of a particular user prestored in memory 177, or the output of adder 175 (FIG. 17), or the output of interference canceller 22 (FIG. 18).

Multipliers 171–174 multiply the input signals of input ports 181–184 by weight vectors $w_1$–$w_4$, and provide the multiplied result to adder 175. Adder 175 adds respective output signals of multipliers 171–174, and provides the result to weight vector calculator 176, and also to the output port directly in the example of FIG. 17, and via interference canceller 22 in the example of FIG. 18.

Figure 19:
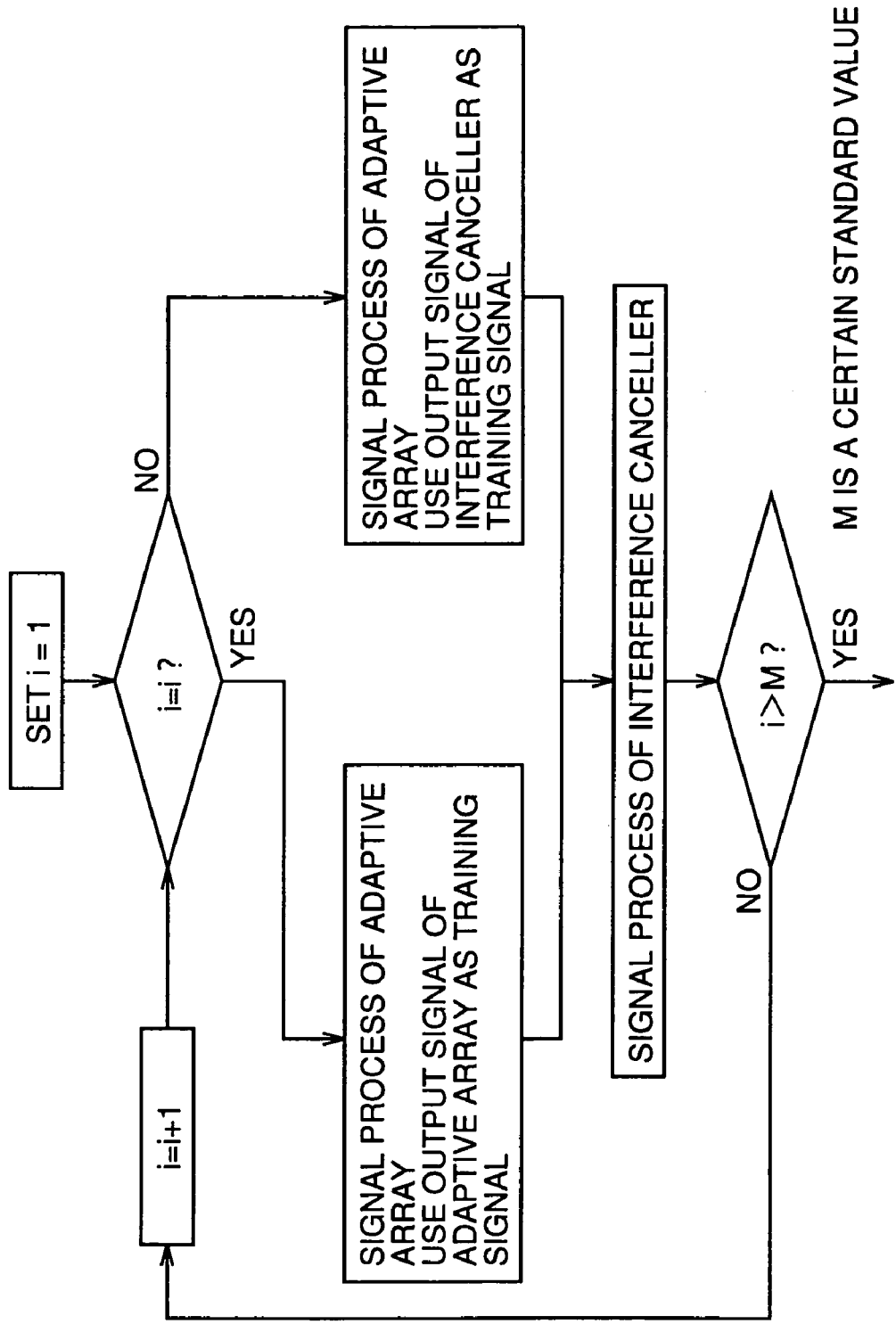
FIG. 19 is a block diagram for describing an operation of the adaptive array shown in FIGS. 17 and 18.

FIG. 19 is a flow chart for describing the operation of the adaptive array shown in FIGS. 17 and 18.

The operation of the adaptive array (for example 17) will be described with reference to FIGS. 17–19. As shown in FIG. 19, loop i is set to 1. Multipliers 171–174 of adaptive array 17 shown in FIG. 17 multiply the signals at the input ports by weight vectors $w_1$–$w_4$ and provide the output to adder 175. Weight vector calculator 176 uses the output signal of adder 175 as the training signal and also provides the output signal to interference canceller 22. Interference canceller 22 cancels the interference user signal from the applied signal.

Then, determination is made whether the number of times of loop i has become greater than a standard value M. If loop i is not greater than standard value M, the loop number is incremented by +1. When determination is made that loop number i is not 1, adaptive array 17 calculates weight vectors $w_1$–$w_4$ according to the procedure shown in FIG. 18. Then, the output signal of interference canceller 22 is used as the training signal. Interference canceller 22 carries out signal processing, which is repeated until the number of loop times i arrives at a certain standard value M.

According to the embodiments of the present invention, the interference user component included in a desired user signal extracted by the adaptive array functioning as a signal extraction means is removed by interference removal means. Therefore, the desired user signal component can be extracted having the interference component more suppressed.

The embodiments shown in FIGS. 1–19 are related to a reception system of a base station for the PDMA. In addition to this PDMA communication system, the CDMA communication system is proposed and already in practice.

In the CDMA communication system, the symbol of the transmitted digital data is multiplied by a predetermined diffusion code at the transmission side for transmission as a signal of a significantly higher frequency. At the reception side, data is demodulated by inverse-diffusing the reception signal using the diffusion code.

By using a plurality of types of different diffusion codes with no correlation with each other, only the signal of a desired user can be reliably separated and extracted by carrying out inverse diffusion with a diffusion code corresponding to that used in transmission even when a plurality of data signals of the same frequency are diffused and transmitted. By employing this CDMA communication system, the communication capacity can further be increased. Such a CDMA communication system is already in practice and well known in the field of art. Therefore, details thereof will be omitted.

The following embodiments have the radio reception system of the present invention applied to the CDMA communication system.

Figure 20:
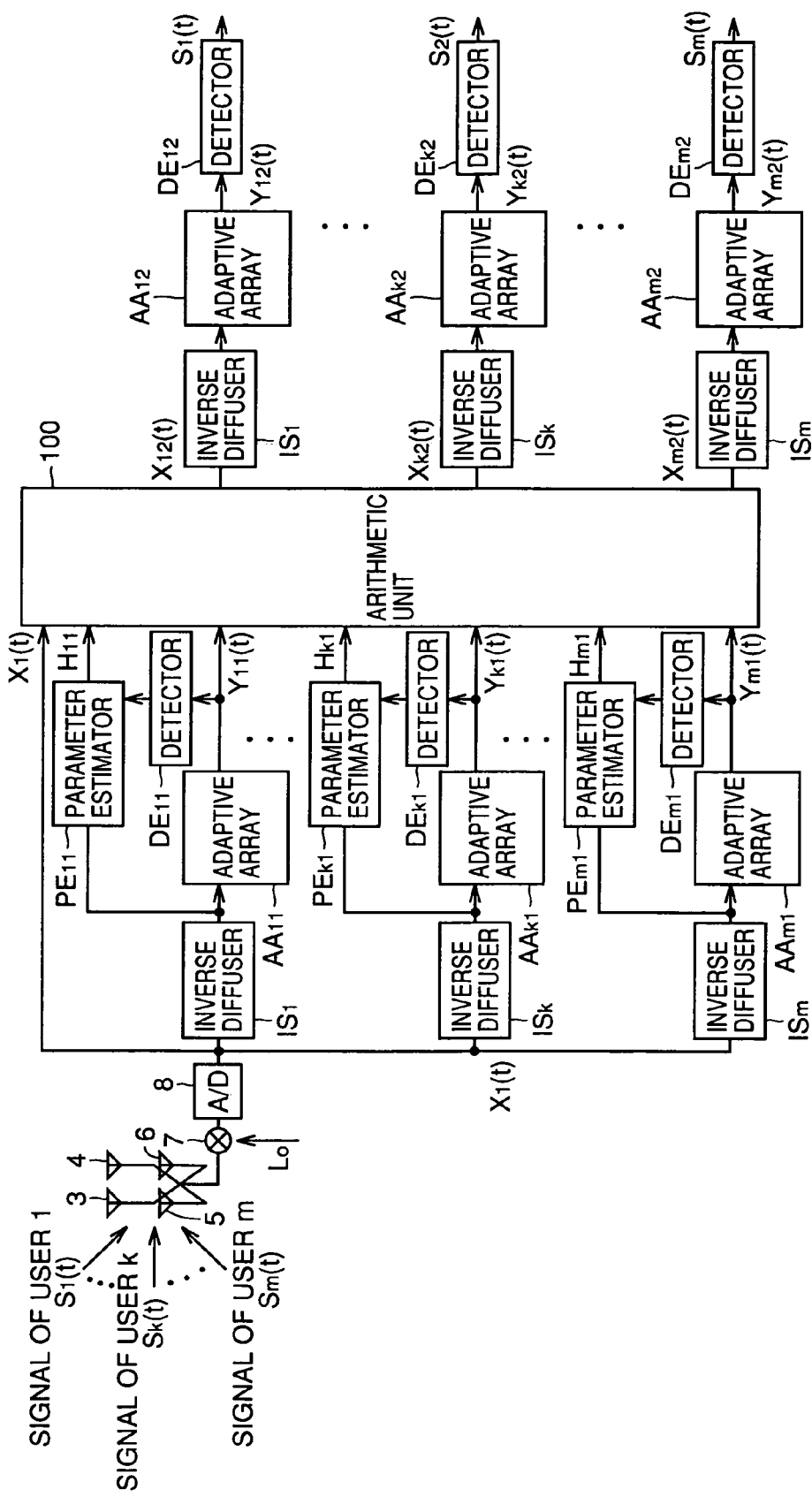
FIG. 20 is a block diagram of a reception system of a base station for the CDMA according to an eleventh embodiment of the present invention.
Figure 21:
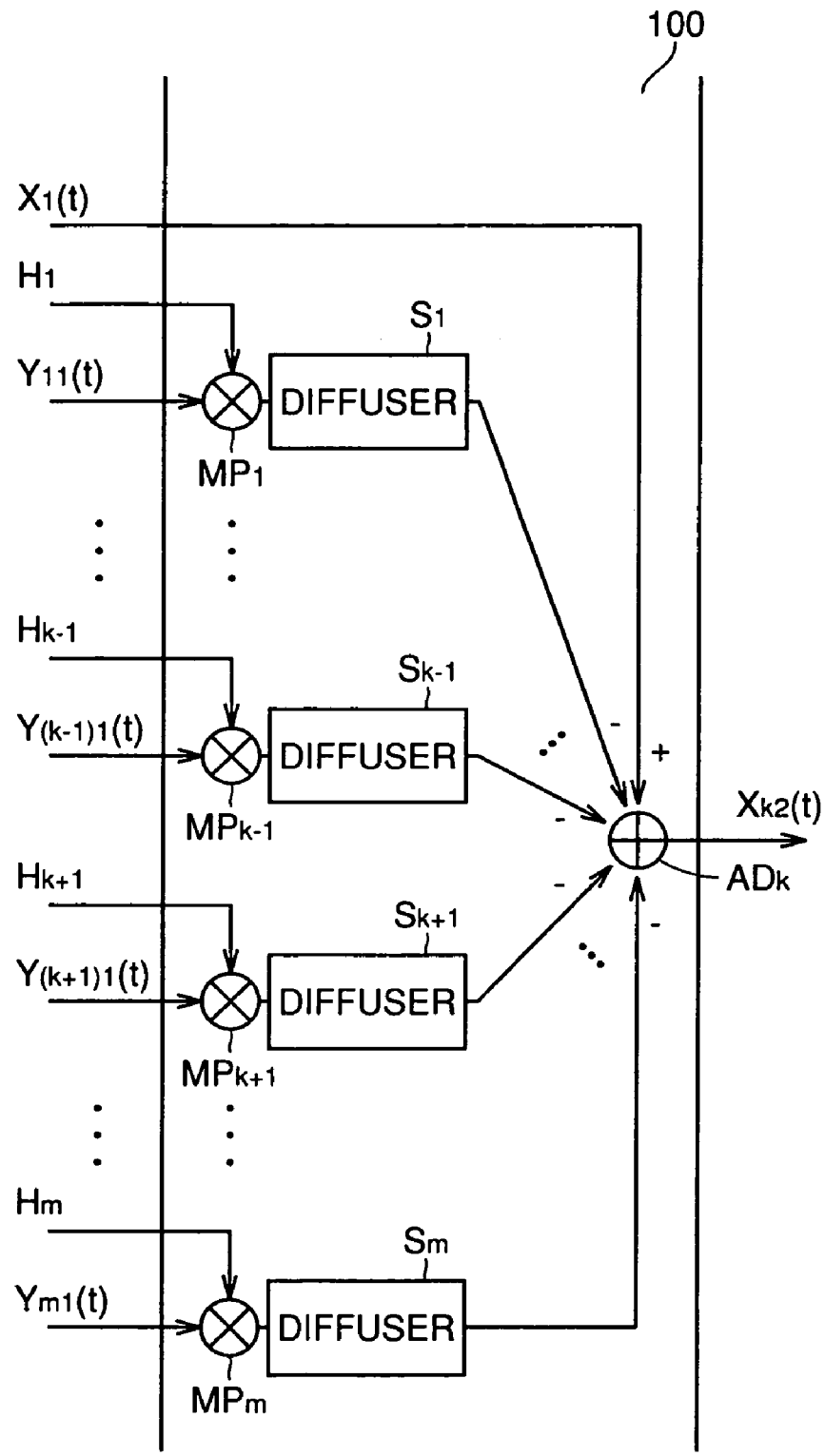
FIG. 21 is a block diagram showing a structure of the arithmetic unit of FIG. 20.

FIG. 20 is a block diagram showing a reception system of a base station for the CDMA according to the eleventh embodiment of the present invention. FIG. 21 is a specific block diagram of the arithmetic unit of FIG. 20.

The CDMA reception system of the eleventh embodiment shown in FIGS. 20 and 21 is similar to the PDMA reception system of the first embodiment shown in FIGS. 1 and 2 except for the following points. Inverse diffusers $IS_1, \ldots, IS_k, \ldots, IS_m$ for inverse-diffusing the signal transmitted by the CDMA communication method and received on antennas 3–6 are provided at the preceding stage of the corresponding adaptive arrays and parameter estimators for respective users. The reception signals inverse-diffused for respective users by respective inverse diffusers are applied to the corresponding adaptive arrays and parameter estimators similar to the aforementioned PDMA signal. By an operation identical to that of the previously-described first embodiment, respective user signals are extracted and applied to arithmetic unit 100.

Arithmetic unit 100 of FIG. 21 is similar to arithmetic unit 100 of FIG. 2 except that diffusers $S_1, \ldots, S_{k-1}, S_{k+1}, \ldots, S_m$ are provided to diffuse respective outputs of multipliers $MP_1, \ldots, MP_{k-1}, MP_{k+1}, \ldots, MP_m$. More specifically, the output of each multiplier is diffused again by a corresponding diffusion code for subtraction from the input signal vector $X_1$ (t) as diffused by the CDMA communication system.

The outputs of respective adders, i. e. the outputs of arithmetic unit 100, are inverse-diffused again by corresponding inverse diffusers $IS_1, \ldots, IS_k, \ldots, IS_m$ as shown in FIG. 20 to be applied to corresponding adaptive arrays $AA_{12}, \ldots, A_{k2}, \ldots, AA_{m2}$. The remaining operation is similar to that of the first embodiment shown in FIGS. 1 and 2.

Figure 22:
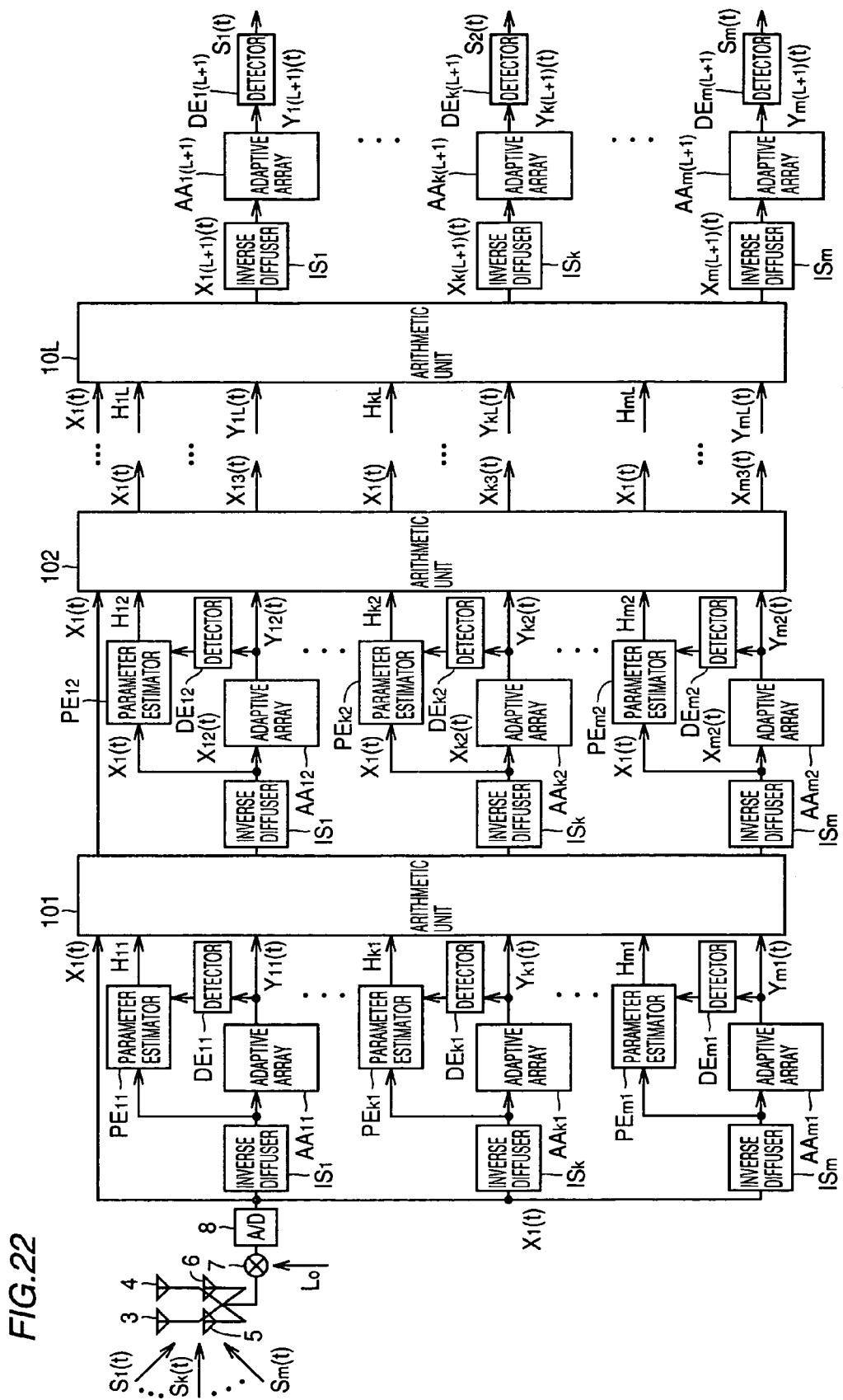
FIGS. 22, 23, 24, 25, and 26 are block diagrams of a reception system of a base station for the CDMA according to a twelfth embodiment, a thirteenth embodiment, a fourteenth embodiment, a fifthteenth embodiment, and a sixteenth embodiment, respectively, of the present invention.

FIG. 22 is a block diagram showing a reception system of a base station for the CDMA according to the twelfth embodiment of the present invention. The embodiment of FIG. 22 further improves the property by providing in series a plurality of stages of the combination of inverse diffusers and a user detection device shown in FIG. 20 to reduce in a stepwise manner the ratio of the signal component of other users included in the user signal output from respective stages. The operation of the user detection device of each stage is as described in details with reference to FIGS. 1, 2, 20 and 21.

Figure 23:
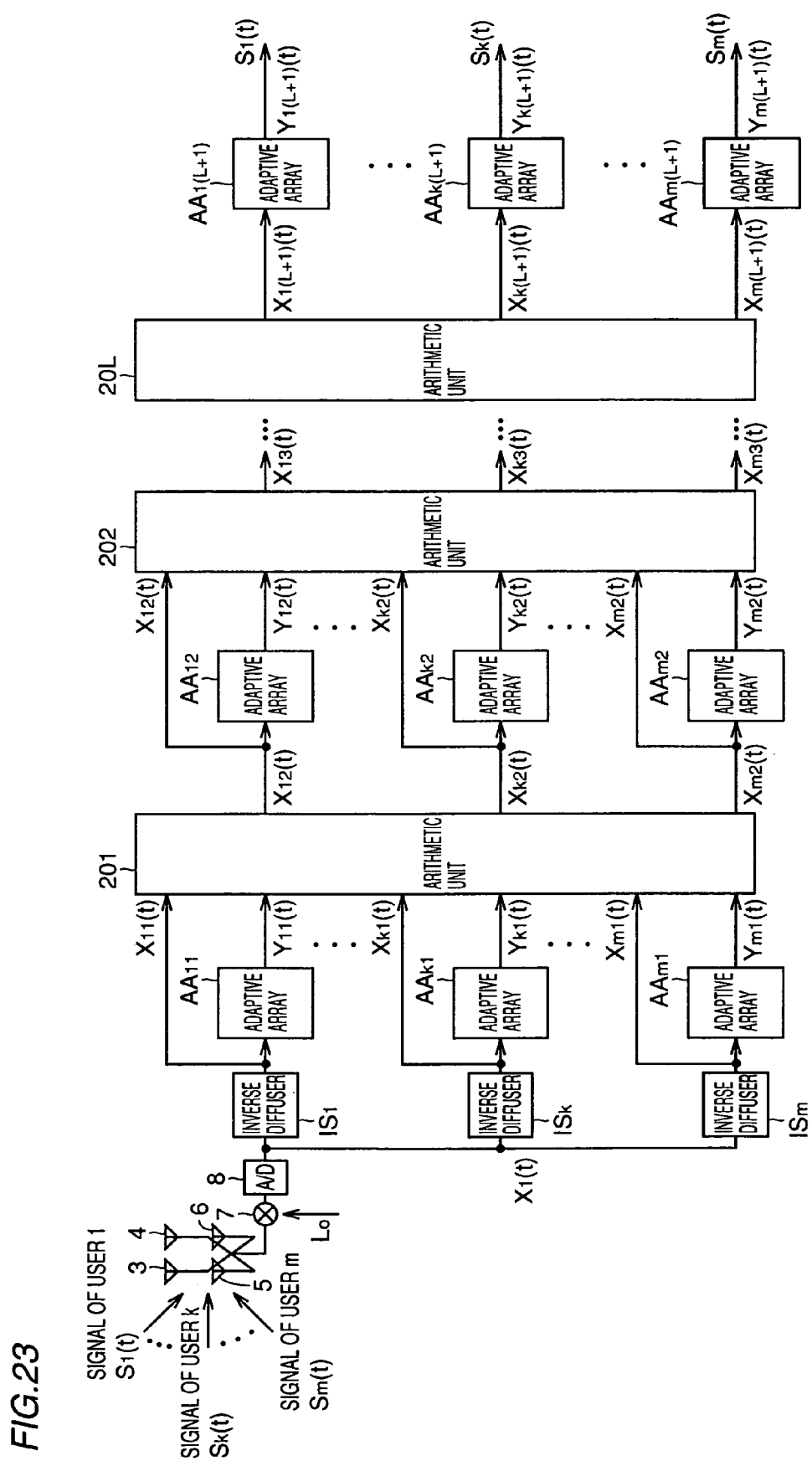

FIG. 23 is a block diagram showing a reception system of a base station for the CDMA according to the thirteenth embodiment of the present invention. The thirteenth embodiment of FIG. 23 is similar to the third embodiment shown in FIG. 4 except for the following points. Inverse diffusers $IS_1, \ldots, IS_k, \ldots, IS_m$ to inverse-diffuse input signal vector $X_1$ (t) transmitted by the CDMA communication system and received on antennas 3–6 are provided for respective users. The input signal vectors $X_{11}$ (t), $\ldots$, $X_{k1}$ (t), $\ldots$, $X_{m1}$ (t) for respective users that are inverse-diffused by respective inverse diffusers are applied to arithmetic unit 201 and also to corresponding adaptive arrays $AA_{11}, \ldots, AA_{k1}, \ldots, AA_{m1}$. The remaining operation is similar to that of the third embodiment shown in FIGS. 4 and 5. Therefore, description thereof will not be repeated.

Figure 24:
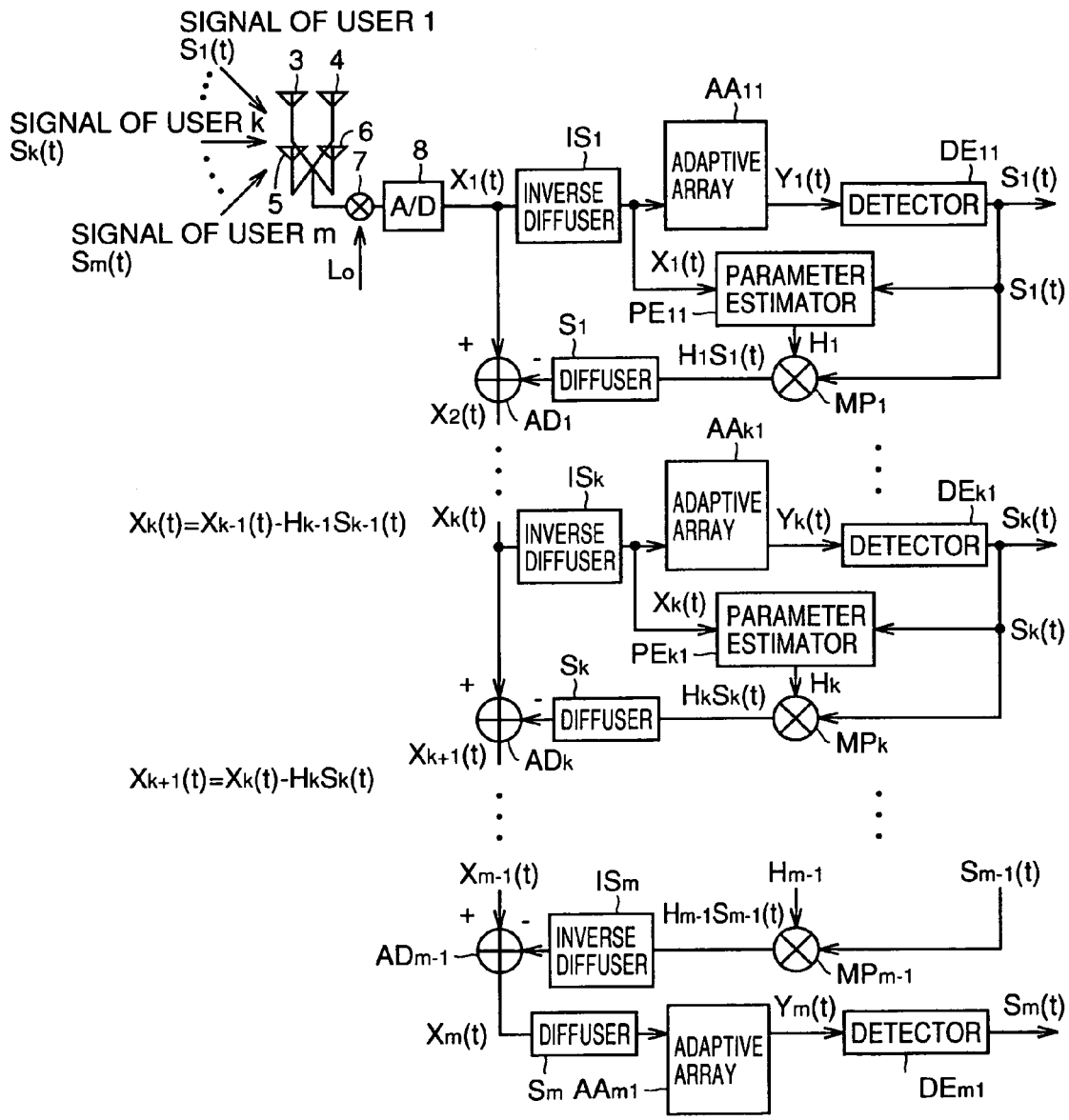

FIG. 24 is a block diagram showing a reception system of a base station for the CDMA according to the fourteenth embodiment of the present invention. The fourteenth embodiment shown in FIG. 24 is similar to the fourth embodiment shown in FIG. 6 except for the following points. Inverse diffusers $IS_1, \ldots, IS_k, \ldots, IS_m$ to inverse-diffuse the input signal vector transmitted by the CDMA communication system are provided at the preceding stage of the corresponding adaptive arrays and parameter estimators for the user detection devices of respective stages. The input signal vector inverse-diffused for each user by a corresponding inverse diffuser is applied to the corresponding adaptive array and parameter estimator similar to the aforementioned PDMA signal, whereby respective user signals are extracted by an operation similar to that of the previous fourth embodiment. The output of the multiplier in each user detection device is diffused again by a corresponding one of diffusers $S_1, \ldots, S_k, \ldots, S_m$ to carry out subtraction from the corresponding input signal vector as diffused by the CDMA system. The remaining operation is similar to that of the fourth embodiment of FIG. 6. Therefore, the description thereof will not be repeated.

Figure 25:
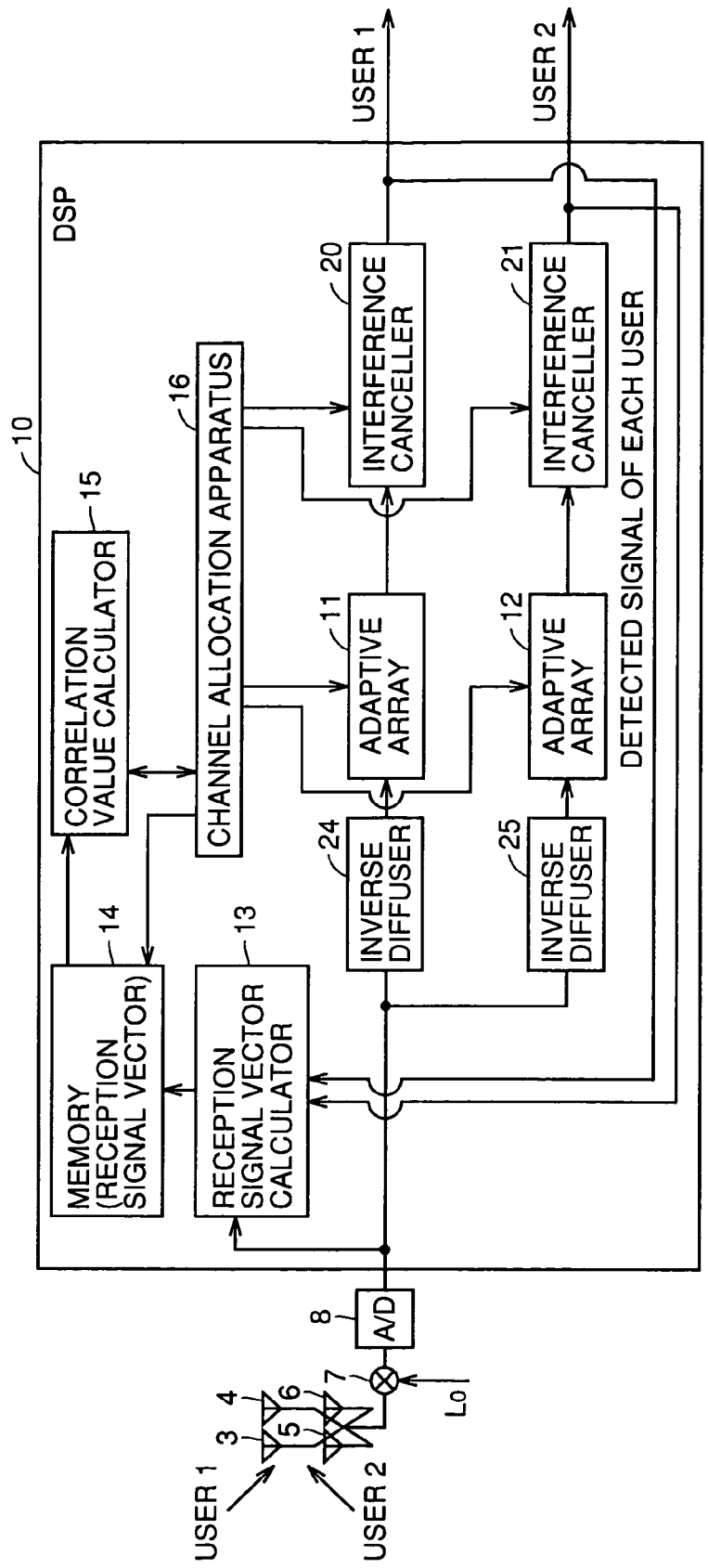

FIG. 25 is a block diagram showing a reception system of a base station for the CDMA according to the fifteenth embodiment of the present invention. The fifteenth embodiment of FIG. 25 is similar to the seventh embodiment of the present invention shown in FIG. 10 except for the following points. Inverse diffusers 24 and 25 to inverse-diffuse the input signal vector transmitted by the CDMA communication method and received on antennas 3–6 are provided at the preceding stage to the adaptive arrays for respective users. The reception signals that are inverse-diffused for respective users by respective inverse diffusers are applied to corresponding adaptive arrays 11 and 12 as the previous PDMA signal, whereby respective user signals are extracted by an operation similar to that of the seventh embodiment.

Figure 26:
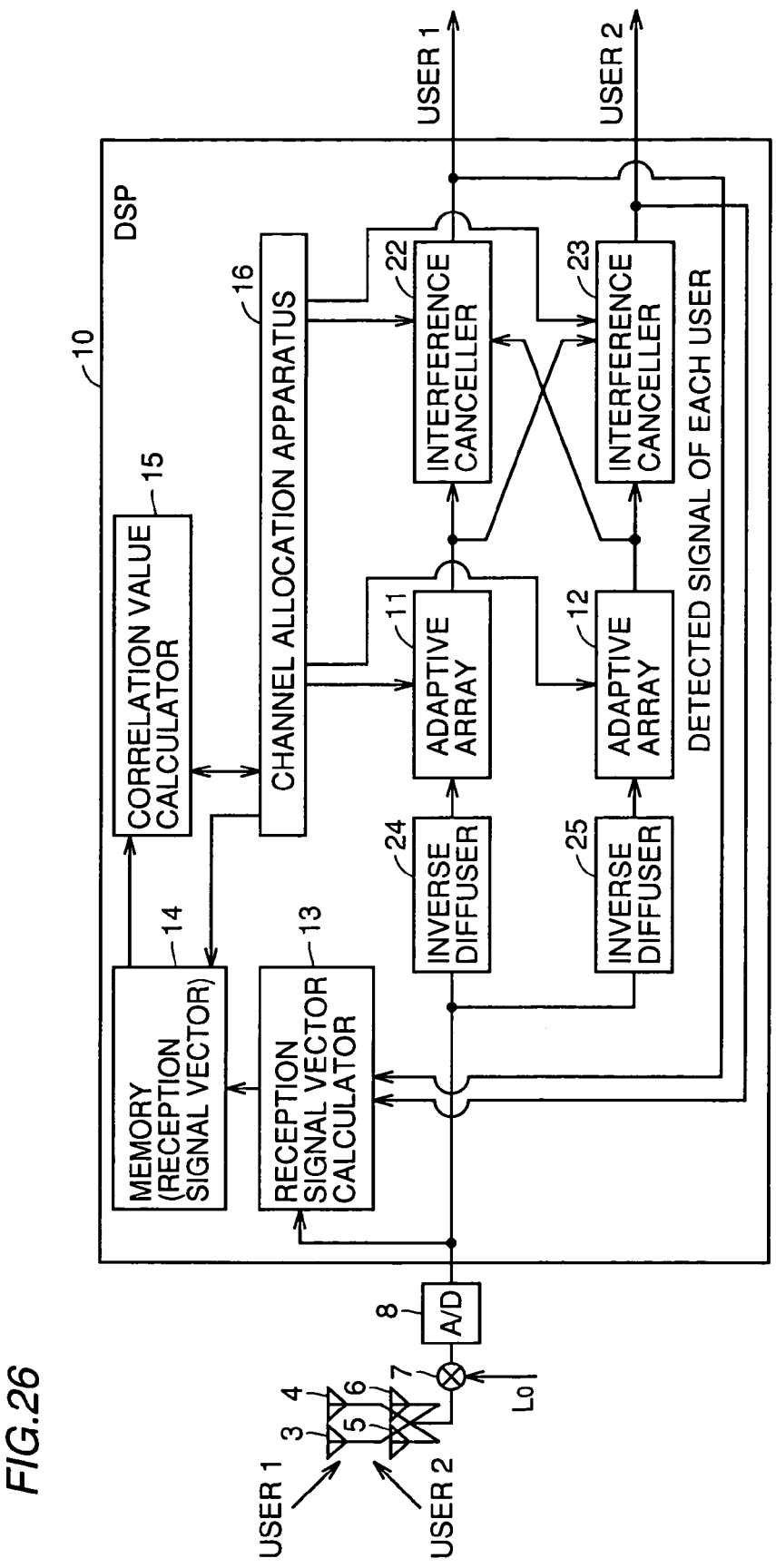

FIG. 26 is a block diagram showing a reception system of a base station for the CDMA according to the sixteenth embodiment of the present invention. The sixteenth embodiment of FIG. 26 is similar to the eighth embodiment shown in FIG. 12 except for the following points. Inverse diffusers 24 and 25 to inverse-diffuse the signal transmitted by the CDMA communication method and received on antennas 3–6 are provided at the preceding stage to corresponding adaptive arrays 11 and 12 for respective users. The reception signal inverse-diffused for respective users by respective inverse diffusers are applied to corresponding adaptive arrays 11 and 12 as the previous PDMA signal, whereby respective user signals are extracted by an operation identical to that of the eighth embodiment.

According to the present invention, the signal component of a desired user can be extracted with the interference component more suppressed by removing the interference user signal component included in the signal of a corresponding desired user extracted by the signal extraction means using interference removal means. Therefore, the communication quality in a radio communication system such as a mobile communication system can be improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A radio reception system for receiving signals from a plurality of users using a plurality of antennas at a single base station site, comprising:
    signal processing means for applying a predetermined signal processing on the signals received with said plurality of antennas;
    signal extraction means for extracting a signal component corresponding to a particular user among said plurality of users according to the signals output from said signal processing means; and
    interference removal means for removing an interference signal component by a signal component of another user included in the signal component extracted by said signal extraction means,
    wherein said interference removal means includes:
        estimation means for estimating a plurality of parameter information associated with signal components from said plurality of users included in the signal component extracted by said signal extraction means,
        a plurality of multiplication means for multiplying the signals of said plurality of users by said plurality of parameter information,
        means for subtracting output signals of said plurality of multiplication means from the signal component extracted by said signal extraction means,
        error estimation means for estimating an error according to an output signal of said subtraction means, and
        selecting means for selecting and providing a series of signals with the smallest error estimated by said error estimation means.

2. A radio reception system for receiving signals from a plurality of users using a plurality of antennas, comprising:
    signal processing means for applying a predetermined signal processing on the signals received with said plurality of antennas; and
    user detection means, said user detection means including:
        signal extraction means for extracting a signal component corresponding to a particular user among said plurality of users according to the signals output from said signal processing means,
        parameter estimation means for estimating parameter information associated with a relationship of the signal component extracted by said signal extraction means with respect to the signal output from said signal processing means, and
        arithmetic means for providing a signal having the signal component corresponding to said particular user removed from the signal output from said signal processing means taking into account said parameter information.

3. The radio reception system according to claim 2, wherein said arithmetic means includes:
    multiplication means for multiplying the signal component by said signal extraction means by corresponding said parameter information, and
    subtraction means for subtracting an output signal of said multiplication means from the signal output from said signal processing means.

4. The radio reception system according to claim 2, wherein said user detection means includes:
    a plurality of said signal extraction means corresponding to said plurality of users,
    a plurality of said parameter estimation means corresponding to said plurality of users, and
    a plurality of said arithmetic means corresponding to said plurality of users.

5. The radio reception system according to claim 2, wherein said user detection means further includes detector means for detecting the output of said signal extraction means.

6. The radio reception system according to claim 2, wherein the signals from said plurality of users are signals transmitted by a Path Division Multiple Access (PDMA) communication system.

7. The radio reception system according to claim 2, wherein the signals from said plurality of users are signals transmitted by a Code Division Multiple Access (CDMA) communication system.

8. The radio reception system according to claim 7, wherein said signal transmitted by the CDMA communication system is diffused in advance by a predetermined diffusion code at a transmission side,
    further comprising inverse diffusion means for inverse-diffusing the signals output from said signal processing means by a corresponding diffusion code by the CDMA communication system and providing the inverse-diffused signal to said signal extraction means.

9. A radio reception system for receiving signals from a plurality of users using a plurality of antennas, comprising:
signal processing means for applying a predetermined signal processing on the signals received with said plurality of antennas; and
a plurality of stages of user detection means,
wherein each stage of said user detection means includes:
signal extraction means for extracting a signal component corresponding to a particular user common to every stage out of said plurality of users through adaptive-array signal processing according to an input signal,
parameter estimation means for estimating parameter information associated with a relationship of the signal component extracted by said signal extraction means with respect to the signal output from said signal processing means, and
arithmetic means for providing a signal having a signal component corresponding to said particular user removed from the signal output from said signal processing means taking into account said parameter information,
wherein said plurality of stages of user detection means are connected so that the signal output from said signal processing means is applied to the input of said signal extraction means of the first stage of said user detection means, and the output of said arithmetic means of the former stage of two adjacent user detection means to applied to the input of said signal extraction means of the latter stage.

10. The radio reception system according to claim 9, wherein said arithmetic means comprises:
multiplication means for multiplying the signal component extracted by said signal extraction means by corresponding said parameter information, and
subtraction means for subtracting an output signal of said multiplication means from the signal output from said signal processing means.

11. The radio reception system according to claim 9, wherein each stage of said user detection means comprises:
a plurality of said signal extraction means corresponding to said plurality of users,
a plurality of said parameter estimation means corresponding to said plurality of users, and
a plurality of said arithmetic means corresponding to said plurality of users.

12. The radio reception system according to claim 9, wherein said user detection means further includes detector means for detecting the output of said signal extraction means.

13. The radio reception system according to claim 9, wherein the signals from said plurality of users are signals transmitted by a Path Division Multiple Access (PDMA) communication system.

14. The radio reception system according to claim 9, wherein the signals from said plurality of users are signals transmitted by a Code Division Multiple Access (CDMA) communication system.

15. The radio reception system according to claim 14, wherein said signal transmitted by the CDMA communication system is diffused in advance by a predetermined diffusion code at a transmission side,
further comprising inverse diffusion means for inverse-diffusing the signals output from said signal processing means by a corresponding diffusion code by the CDMA communication system and providing the inverse-diffused signal to said signal extraction means.

16. A radio reception system for receiving signals from a plurality of users using a plurality of antennas, comprising:
signal processing means for applying a predetermined signal processing on the signals received with said plurality of antennas; and
a plurality of stages of user detection means,
wherein each stage of said user detection means includes:
signal extraction means for extracting a signal component corresponding to a particular user out of said plurality of users through adaptive-array signal processing according to an input signal,
parameter estimation means for estimating parameter information associated with a relationship of the signal component extracted by said signal extraction means with respect to the signal input from said signal extraction means, and
arithmetic means for providing a signal having the signal component corresponding to said particular user removed from the signal input to said signal processing means taking into account said parameter information,
wherein said plurality of stages of user detection means are connected to that the signal output from said signal processing means is applied to the input of said signal extraction means of the first stage of said user detection means, and the output of said arithmetic means of the former stage of two adjacent user detection means is applied to the input of said signal extraction means of the latter stage.

17. The radio reception system according to claim 16, wherein said arithmetic means comprises:
multiplication means for multiplying the signal component extracted by said signal extraction means by corresponding said parameter information, and
subtraction means for subtracting an output signal of said multiplication means from the signal input to said signal processing means.

18. The radio reception system according to claim 16, wherein each stage of said user detection means comprises:
a plurality of said signal extraction means corresponding to said plurality of users,
a plurality of said parameter estimation means corresponding to said plurality of users, and
a plurality of said arithmetic means corresponding to said plurality of users.

19. The radio reception system according to claim 16, wherein said user detection means further includes detector means for detecting the output of said signal extraction means.

20. The radio reception system according to claim 16, wherein the signals from said plurality of users are signals transmitted by a Path Division Multiple Access (PDMA) communication system.

21. The radio reception system according to claim 16, wherein the signals from said plurality of users are signals transmitted by a Code Division Multiple Access (CDMA) communication system.

22. The radio reception system according to claim 21, wherein said signal transmitted by the CDMA communication system is diffused in advance by a predetermined diffusion code at a transmitter side,
further comprising inverse diffusion means for inverse-diffusing the signals output from said signal processing means by a corresponding diffusion code by the CDMA communication system and providing the inverse-diffused signal to said signal extraction means.

23. A radio reception system for receiving signals from a plurality of users using a plurality of antennas, comprising:
   signal processing means for applying a predetermined signal processing on the signals received with said plurality of antennas; and
   a plurality of stages of user detection means,
   wherein each stage of said user detection means includes:
      signal extraction means for extracting and providing a signal component differing from each stage corresponding to a particular user out of said plurality of users through adaptive-array signal processing according to an input signal,
      parameter estimation means for estimating parameter information associated with a relationship of the signal component extracted by said signal extraction means with respect to the signal input to said signal extraction means, and
      arithmetic means for removing the signal component corresponding to said particular user from the signal input to said extraction means taking into account said parameter information,
   wherein said plurality of stages of user detection means are connected to that the signal output from said signal processing means is applied to the input of said signal extraction means of the first stage of said user detection means, and the output of said arithmetic means of the former stage of two adjacent user detection means to applied to the input of said signal extraction means of the latter stage.

24. The radio reception system according to claim 23, wherein said arithmetic means comprises:
   multiplication means for multiplying the signal component extracted by said signal extraction means by corresponding said parameter information, and
   subtraction means for subtracting an output signal of said multiplication means from the signal input to said signal processing means.

25. The radio reception system according to claim 23, wherein said user detection means further includes detection means for detecting the output of said signal extraction means.

26. The radio reception system according to claim 23, wherein the signals from said plurality of users are signals transmitted by a Path Division Multiple Access (PDMA) communication system.

27. The radio reception system according to claim 23, wherein the signals from said plurality of users are signals transmitted by a Code Division Multiple Access (CDMA) communication system.

28. The radio reception system according to claim 27, wherein said signal transmitted by the CDMA communication system is diffused in advance by a predetermined diffusion code at a transmitter side,
   further comprising inverse diffusion means for inverse-diffusing the signals output from said signal processing means by a corresponding diffusion code by the CDMA communication system and providing the inverse-diffused signal to said signal extraction means.

* * * * *